(12) United States Patent
Ohmae et al.

(10) Patent No.: US 12,161,964 B2
(45) Date of Patent: Dec. 10, 2024

(54) CYLINDRICAL HEATING UNIT AND EXHAUST GAS PROCESSING DEVICE INCLUDING THE CYLINDRICAL HEATING UNIT

(71) Applicant: KANKEN TECHNO CO., LTD., Kyoto (JP)

(72) Inventors: Hideharu Ohmae, Kyoto (JP); Masamitsu Hagio, Kyoto (JP); Hiroshi Imamura, Kyoto (JP)

(73) Assignee: KANKEN TECHNO CO., LTD., Kyoto (JP)

( * ) Notice: Subject to any disclaimer, the term of this patent is extended or adjusted under 35 U.S.C. 154(b) by 0 days.

(21) Appl. No.: 18/247,127

(22) PCT Filed: Jan. 28, 2022

(86) PCT No.: PCT/JP2022/003418
§ 371 (c)(1),
(2) Date: Mar. 29, 2023

(87) PCT Pub. No.: WO2023/145022
PCT Pub. Date: Aug. 3, 2023

(65) Prior Publication Data
US 2024/0082777 A1 Mar. 14, 2024

(51) Int. Cl.
*B01D 53/00* (2006.01)
*B01D 53/46* (2006.01)
*F23G 7/06* (2006.01)

(52) U.S. Cl.
CPC .......... *B01D 53/005* (2013.01); *F23G 7/063* (2013.01); *B01D 53/46* (2013.01)

(58) Field of Classification Search
None
See application file for complete search history.

(56) References Cited

U.S. PATENT DOCUMENTS

| | | | | | |
|---|---|---|---|---|---|
| 2,163,457 | A | * | 6/1939 | Challet | H05B 3/688 338/315 |
| 3,358,074 | A | * | 12/1967 | Himes | H05B 3/16 219/532 |
| 6,002,116 | A | * | 12/1999 | St. Louis | H05B 3/32 219/465.1 |

FOREIGN PATENT DOCUMENTS

| | | |
|---|---|---|
| CN | 101332405 A | 12/2008 |
| CN | 105649714 A | 6/2016 |

(Continued)

OTHER PUBLICATIONS

State Intellectual Property Office of Republic of China, Chinese Office Action dated Jan. 17, 2024 for the related Chinese patent application No. 202280007645.0, and its machine English translation, 15 pages.

(Continued)

*Primary Examiner* — Michael Forrest
(74) *Attorney, Agent, or Firm* — Lucas & Mercanti, LLP

(57) ABSTRACT

A cylindrical heating unit of an exhaust gas processing device is installed in a reactor. The cylindrical heating unit is provided with an exhaust gas introduction port provided in an insertion base part and a heated exhaust gas outlet provided at insertion end. The cylindrical heating unit includes a hollow cylinder, insulators, electric heaters, and holding members. The hollow cylinder has a double structure with an inner cylinder and an outer cylinder made of metal. A plurality of the insulators surround the inner cylinder and are provided at intervals from each other in a heater installation space between the inner cylinder and the outer cylinder. Electric heaters are mounted to the insulators. The holding members are attached to one of the inner cylinder and the outer cylinder or both and hold the insulators in the heater installation space.

12 Claims, 14 Drawing Sheets

(56) References Cited

FOREIGN PATENT DOCUMENTS

| | | | |
|---|---|---|---|
| CN | 107073392 | A | 8/2017 |
| JP | 10-085555 | A | 4/1998 |
| JP | 2002-153726 | A | 5/2002 |
| JP | 2011-029028 | A | 2/2011 |
| TW | 200848150 | A | 12/2008 |
| WO | 2008-096466 | A1 | 8/2008 |
| WO | 2021-255893 | A1 | 12/2021 |
| WO | 2022-009313 | A1 | 1/2022 |

OTHER PUBLICATIONS

Taiwanese Office Action dated Jan. 12, 2023 for the related Taiwanese application No. 111120055, and machine English translation, 15 pages.

PCT, International Search Report mailed Apr. 5, 2022, for the corresponding International application No. PCT/JP2022/003418, 6 pages.

\* cited by examiner (a)

(b)

(a)

(b)

(b)

CYLINDRICAL HEATING UNIT AND EXHAUST GAS PROCESSING DEVICE INCLUDING THE CYLINDRICAL HEATING UNIT

CROSS REFERENCE TO RELATED APPLICATION

This application is a 371 of PCT/JP2022/003418, filed Jan. 28, 2022, which is incorporated herein by reference.

TECHNICAL FIELD

The present invention relates to improvement in a cylindrical heating unit included in an exhaust gas processing device for thermally decomposing a gas harmful to the human body, an ozone layer depleting gas, and the like exhausted through an industrial process or the like, and more particularly, to an exhaust gas processing device including the cylindrical heating unit.

BACKGROUND ART

In industrial processes including processing and manufacturing products, various kinds of gases are used. Accordingly, types of gases (hereinafter, referred to as "processing-target exhaust gas") exhausted through the industrial processes are also of a wide variety. Various kinds of exhaust gas processing methods and exhaust gas processing systems are used according to the type of processing-target exhaust gas.

For example, taking a semiconductor manufacturing process as an example, various kinds of gases such as monosilane ($SiH_4$), a chlorine gas, and perfluoro compounds (PFCs) are used. Since these gases have an adverse effect on the human body or a global environment, the gases need to be decomposed or eliminated by some means and thus various processing methods have been put into practical use. Typical examples of the processing method include absorption, wet processing, electrothermal oxidative decomposition, and flame burning. However, each of them includes advantages and problems.

Among the above methods, the flame burning has a wide application field for processing-target exhaust gases (that is, can decompose a wide variety of processing-target exhaust gases), but there is a concern about safety issues in the operation while a large gas volume treatment can be performed. This is because the flame burning type basically uses a burner for combustion and is a method in which an exhaust gas is introduced into the combustion atmosphere to perform thermal decomposition. Specifically, an unsafe situation is brought about if combustion failure (flame extinction) is caused by some factors.

On the other hand, the electrothermal oxidative decomposition type using an electric heater is the most prevalent decomposition method at present as an exhaust gas processing method in semiconductor manufacturing processes, allows processing steps to be easily controlled in decomposition of a processing-target exhaust gas, and allows the processing-target exhaust gas to be safely decomposed. As an exhaust gas processing system using an electric heater, there is a system described in Patent Literature 1.

CITATION LIST

Patent Literature

[PTL 1] International Publication No. WO2008/096466

SUMMARY OF INVENTION

Technical Problem

An exhaust gas processing device of an exhaust gas processing system described in Patent Literature 1 (paragraph number [0056]) includes a cylindrical heating unit for thermally decomposing a processing-target gas introduced in an exhaust gas processing space in a reactor thereof. The cylindrical heating unit is configured by: spirally winding and arranging an electric heater such as a nichrome wire or Kanthal (registered trademark of Sandvik AB) wire, which is a heating resistor, between pipe walls of a double pipe formed by an inner cylinder and an outer cylinder made of metal; and filling the space between the pipe walls of the double pipe with ceramic powder or a refractory material for insulation. The inner cylinder and the outer cylinder made of metal are for protecting the electric heater from a corrosive processing-target exhaust gas atmosphere.

The cylindrical heating unit is installed so as to stand in the center inside the reactor, and the processing-target exhaust gas introduced from an exhaust gas introduction port in a bottom part of the cylindrical heating unit passes through a high-temperature internal space of the cylindrical heating unit and is discharged from an upper end opening of the internal space to a high-temperature exhaust gas processing space formed in the vicinity of the ceiling of the reactor.

While passing through the inside of the cylindrical heating unit and further passing through the above-described exhaust gas processing space, the processing-target exhaust gas is heated by the circumference of the cylindrical heating unit at high temperatures (atmospheric temperature: 800 to 1150° C.) to be decomposed.

In the cylindrical heating unit in which such high temperatures are required, the ceramic powder or the refractory material filled in the double pipe has a large thermal capacity and also has less heat conductivity than metal. Thus, the heat transfer efficiency from the pipe wall to the processing-target exhaust gas is poor. In order to generate the high temperatures as described above on the inner/outer wall surfaces of the double pipe, much higher temperature (for example, temperature close to 1400° C.) than the above-described combustion atmosphere temperature is required for the electric heater. Such high temperatures promote surface oxidation of the electric heater and the inner/outer cylinders made of metal, thereby depositing metal oxide. Deposition of the metal oxide or oxidation of the electric heater is one of the causes of disconnection.

In addition to this, heat generated from the electric heater is reflected on the electric heater by the high-temperature ceramic powder or refractory material surrounding the electric heater, and radiant heat from the high-temperature ceramic powder or refractory material raises the temperature of the electric heater up to the control temperature or more. This is also a cause of disconnection of the electric heater.

In addition, the above-described high temperatures reduce electric insulation properties of the ceramic powder or the refractory material that is an insulator. The reduction in electric insulation properties causes a short circuit due to an electric leakage between the electric heater and structures (the inner cylinder or the outer cylinder made of metal) of the device and the short circuit is also a cause of disconnection, thereby greatly influencing a heater life.

The present invention has been made in view of such problems of the conventional example, and the first object of the present invention is to provide a cylindrical heating unit, of an exhaust gas processing device, capable of reducing thermal capacity, keeping heat generation temperature of the electric heater low by improving heat transfer efficiency for the inner/outer cylinders, and greatly extending the electric heater life. The second object of the present invention is to provide an exhaust gas processing device that includes the cylindrical heating unit, greatly restrains disconnection of the electric heater, and has excellent thermal efficiency.

Solution to Problem

The invention (FIG. 2) defined in embodiment 1 is directed to a cylindrical heating unit 14 of an exhaust gas processing device 1, the cylindrical heating unit 14 being installed in a reactor 10, and the reactor 10 is provided with an exhaust gas processing space S inside the reactor 10 and a decomposed exhaust gas exhaust port 12 for an exhaust gas G processed in the exhaust gas processing space S.

The cylindrical heating unit 14 is provided with an exhaust gas introduction port 15 provided in an insertion base part thereof to the reactor 10, and a heated exhaust gas outlet 16, which is open to the exhaust gas processing space S, provided at an insertion end thereof to the reactor 10.

The cylindrical heating unit 14 includes: a hollow cylinder 20 having a double structure with an inner cylinder 21 made of metal and an outer cylinder 22 made of metal; a plurality of insulators 30 surrounding the inner cylinder 21 and provided at intervals from each other in a heater installation space P between the inner cylinder 21 and the outer cylinder 22; electric heaters H mounted to the insulators 30; and holding members 40 attached to one of the inner cylinder 21 and the outer cylinder 22 or both the cylinders 21, 22, and holding each insulator 30 in the heater installation space P by supporting a lower surface 34 of the insulator 30 or supporting the lower surface 34 and an upper surface 35 of the insulator 30.

The invention (FIG. 4 (b), FIG. 8 (a), (b)) defined in embodiment 2 relates to a method of holding the insulator 30 by the holding members 40 (point contact).

In the cylindrical heating unit 14 of the exhaust gas processing device 1 according to embodiment 1, contact surfaces 41, with the insulators 30, of the holding members 40 are each formed as an inclined plane relative to the lower surface 34 of the insulator 30 or each of the lower surface 34 and the upper surface 35 of the insulator 30.

The invention (FIG. 6, FIG. 7) defined in embodiment 3 relates to the number of holding members 40 installed.

In the cylindrical heating unit 14 of the exhaust gas processing device 1 according to embodiment 1 or 2, the holding members 40 are each a plate-like or block-like member, and are installed at at least three places with respect to the inner cylinder 21 or the outer cylinder 22.

The invention (FIG. 2 (a), FIG. 8 (a)) defined in embodiment 4 relates to a material and a first mounting method of the holding member 40.

In the cylindrical heating unit 14 of the exhaust gas processing device 1 according to any one of embodiments 1 to 3, the holding members 40 are made of a material (for example, Kanthal (registered trademark), nichrome, or ceramic) having a higher electric resistance value than the inner cylinder 21 or outer cylinder 22, and are attached to the inner cylinder 21 or the outer cylinder 22 with joining layers 42 provided by welding for the holding members 40 made of metal or with an inorganic adhesive for the holding members 40 made of ceramic.

The invention (FIG. 2 (b), FIG. 8 (b)) defined in embodiment 5 relates to a material and a second mounting method of the holding member 40.

The cylindrical heating unit 14 of the exhaust gas processing device 1 according to any one of embodiments 1 to 3 further includes support members 44 that are made of the same material as that of the inner cylinder 21 or the outer cylinder 22 and are welded to the inner cylinder 21 or the outer cylinder 22 or both the cylinders, and support holding members 40b on the lower side from the lower side and holding members 40a on the upper side from the upper side.

The invention (FIG. 8 (a), (b)) defined in embodiment 6 relates to a method of holding the electric heaters H by the insulator 30.

In the cylindrical heating unit 14 of the exhaust gas processing device 1 according to any one of embodiments 1 to 5, each of the insulators 30 has a disk-like shape with a central hole 33 drilled in the center thereof, and the inner cylinder 21 is inserted in the central hole 33. Heater holding holes 32h for holding the electric heaters H are formed at a plurality of places around the central hole 33.

The heater holding holes 32h each have an inner circumference surface provided with a support projection portion 32t in contact with the outer circumference surface of the electric heater H.

The invention (FIG. 6, FIG. 7, FIG. 9) defined in embodiment 7 relates to a first shape of the insulator 30.

In the cylindrical heating unit 14 of the exhaust gas processing device 1 according to any one of embodiments 1 to 6, between the adjacent heater holding holes 32h, notches 38 are provided by cutting the insulator 30 from a circumscribed circle 30e to positions across the heater holding holes 32h so as to separate the adjacent heater holding holes 32h from each other.

The invention (FIG. 10 to FIG. 12) defined in embodiment 8 relates to a second shape of the insulator 30.

In the cylindrical heating unit 14 of the exhaust gas processing device 1 according to any one of embodiments 1 to 6, between the adjacent heater holding holes 32h, separate grooves 36 are provided by recessing the insulator 30 from an outer circumference surface 30a to positions across the heater holding holes 32h so as to separate the adjacent heater holding holes 32h from each other in the upper surface 35 of the insulator 30.

The invention (FIG. 13 to FIG. 15) defined in embodiment 9 relates to a third shape of the insulator 30.

In the cylindrical heating unit 14 of the exhaust gas processing device 1 according to any one of embodiments 1 to 8, a ring-like recessed groove 39 is provided around an inner circumference surface 30b between the heater holding holes 32h and the inner circumference surface 30b of the insulator 30, in the lower surface 34 or the upper surface 35 or both the upper and lower surfaces 34, 35 of the insulator 30.

The invention (FIG. 13 to FIG. 15) defined in embodiment 10 is directed to an improved insulator 30 according to embodiment 9.

In the cylindrical heating unit 14 of the exhaust gas processing device 1 according to embodiment 9, the insulator 30 has both the upper and lower surfaces 34, 35 held by the holding members 40.

The ring-like recessed grooves 39 are formed such that a distance from the heater holding holes 32h to the holding members 40a on the upper surface side on the upper surface 35 is equal to a distance from the heater holding holes 32h to the holding members 40b on the lower surface side on the lower surface 34.

The invention (FIG. 16, FIG. 17) defined in embodiment 11 relates to a first holding method of a temperature sensor 70 mounted in the cylindrical heating unit 14.

In the cylindrical heating unit 14 of the exhaust gas processing device 1 according to any one of embodiments 1 to 10, a sensor holding part 60 includes three sensor holding plates 61, 62, 63 that are welded to an outer circumference surface of the inner cylinder 21 or an inner circumference surface of the outer cylinder 22 so as to be arranged in the up-down direction and respectively have through-holes 61h, 62h, 63h drilled on the same line and holding the temperature sensor 70.

The through-holes 61h, 62h, 63h are provided such that inner circumference surfaces of the through-holes 61h, 63h of the sensor holding plates 61, 63 at an upper stage and a lower stage push one side surface of the temperature sensor 70 and an inner circumference surface of the through-hole 62h of the sensor holding plate 62 at a middle stage pushes an opposite side surface of the temperature sensor 70.

The sensor holding plates 61, 63 at the upper stage and the lower stage are made of metal plates having the same coefficient of thermal expansion, and the sensor holding plate 62 at the middle stage is made of a metal plate having a coefficient of thermal expansion different from that of the sensor holding plates 61, 63 at the upper and lower stages.

The invention (FIG. 18, FIG. 19) defined in embodiment 12 relates to a second holding method of a temperature sensor 70 mounted in the cylindrical heating unit 14.

In the cylindrical heating unit 14 of the exhaust gas processing device 1 according to any one of embodiments 1 to 10, a sensor holding part 60 is provided in the hollow cylinder 20. The sensor holding part 60 includes two sensor holding plates 61, 62 that are welded to an outer circumference surface of the inner cylinder 21 or an inner circumference surface of the outer cylinder 22 so as to be arranged in the up-down direction and respectively have through-holes 61h, 62h drilled on the same line and holding the temperature sensor 70, and a bottom plate 23 that is provided at a bottom part between the inner cylinder 21 and the outer cylinder 22 and has a through-hole 23h drilled so as to be aligned with a straight line passing through the through-holes 61h, 62h.

The through-holes 61h, 62h, 23h are provided such that the inner circumference surfaces of the through-hole 61h at the upper stage and the through-hole 23h of the bottom plate 23 push one side surface of the temperature sensor 70, and the inner circumference surface of the through-hole 62h of the sensor holding plate 62 at the middle stage pushes an opposite side surface of the temperature sensor 70.

The sensor holding plate 61 at the upper stage and the bottom plate 23 are made of metal materials having the same coefficient of thermal expansion, and the sensor holding plate 62 at the middle stage between the sensor holding plate 61 at the upper stage and the bottom plate 23 is made of a metal material having a coefficient of thermal expansion different from that of the sensor holding plate 61 at the upper stage.

The invention (FIG. 2, FIG. 6, FIG. 8 (*a*)) defined in embodiment 13 is directed to an exhaust gas processing device 1, and the exhaust gas processing device 1 includes: a reactor 10 provided with an exhaust gas processing space S inside the reactor 10 and a decomposed exhaust gas exhaust port 12 for an exhaust gas G processed in the exhaust gas processing space S; and a cylindrical heating unit 14 installed in the reactor 10.

The cylindrical heating unit 14 is provided with an exhaust gas introduction port 15 provided in an insertion base part thereof to the reactor 10, and a heated exhaust gas outlet 16, which is open to the exhaust gas processing space S, provided at an insertion end thereof to the reactor 10.

The cylindrical heating unit 14 includes: a hollow cylinder 20 having a double structure with an inner cylinder 21 made of metal and an outer cylinder 22 made of metal; a plurality of insulators 30 surrounding the inner cylinder 21 and provided at intervals from each other in a heater installation space P between the inner cylinder 21 and the outer cylinder 22; electric heaters H mounted to the insulators 30; and holding members 40 attached to one of the inner cylinder 21 and the outer cylinder 22 or both the cylinders 21, 22 and holding the insulators 30 in the heater installation space P by supporting the insulators 30.

The holding members 40 are installed at at least three places relative to the inner cylinder 21 or the outer cylinder 22, and have contact surfaces 41 relative to the insulators 30. Each contact surface 41 of the holding members 40 is formed as an inclined plane so as to be in point contact with a lower surface 34 of the insulator 30 or the lower surface 34 and an upper surface 35 of the insulator 30.

Advantageous Effects of Invention

Since the cylindrical heating unit 14 (exhaust gas processing device 1) according to the present invention is configured as described above, the thermal capacity thereof is small and the heat transfer efficiency thereof is high. Therefore, the heat generation temperature of the electric heaters H can be maintained low. Furthermore, a short circuit between the electric heaters H and the inner cylinder 21 made of metal (or the outer cylinder 22 made of metal) brought about by an increase in temperature can be prevented. As a result, the heater life can be greatly extended.

DESCRIPTION OF EMBODIMENTS

Figure 1:
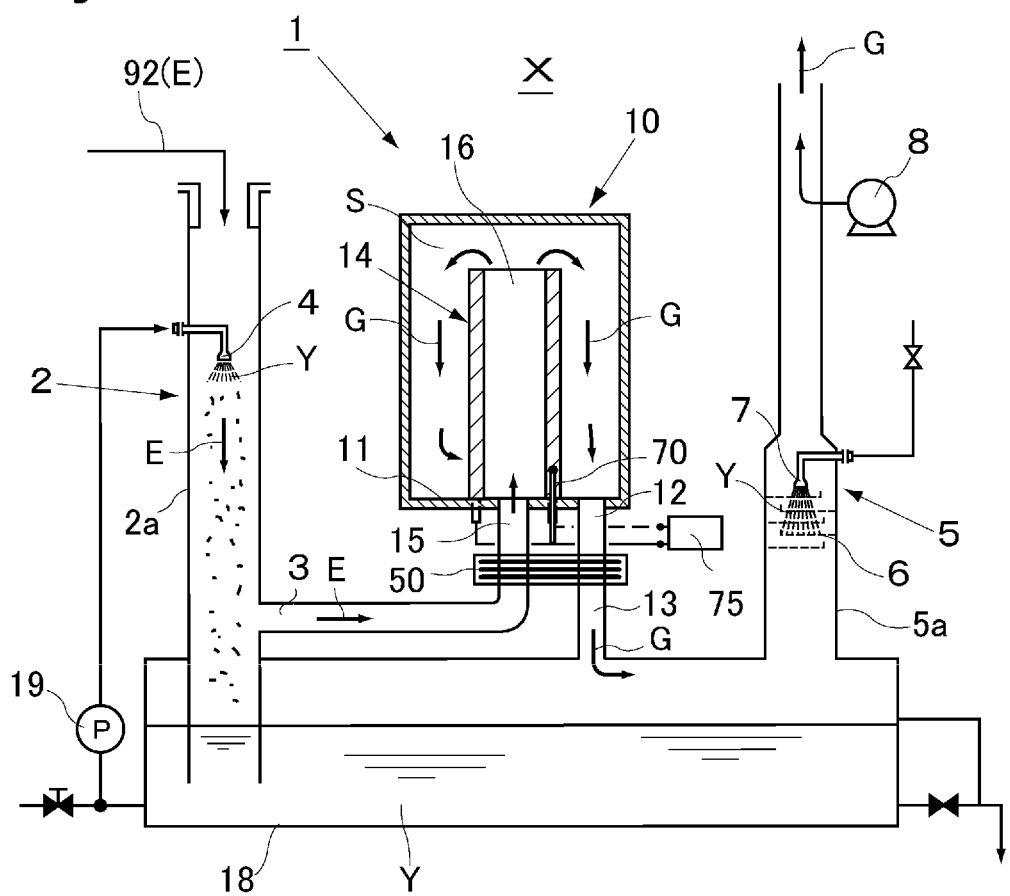
FIG. 1 is a schematic view of the present invention system.

Hereinafter, with reference to exemplary drawings, the present invention will be described. FIG. 1 is a schematic view showing one embodiment of an exhaust gas processing system X in which an exhaust gas processing device 1 of the present invention is used, and the exhaust gas processing device 1 is a device that thermally decomposes processing-target exhaust gases E exhausted through industrial processes. The exhaust gas processing system X of the present embodiment is generally composed of the exhaust gas processing device 1, an inlet scrubber 2, an outlet scrubber 5, and auxiliary equipment thereof.

For the above-described exhaust gas processing device 1, there are an electrothermal oxidative decomposition type, a flame combustion type, and a combination type using both the electrothermal oxidative decomposition type and the flame combustion type. The present invention is directed to the exhaust gas processing device 1 of the electrothermal oxidative decomposition type. The electrothermal oxidative decomposition type exhaust gas processing device 1 is generally composed of a reactor 10, a cylindrical heating unit 14, and a chemical liquid tank 18.

The inlet scrubber 2 is for eliminating (washing with liquid) dust, water-soluble components, and the like contained in the processing-target exhaust gas E to be introduced into the exhaust gas processing device 1, and includes a straight tube type inlet scrubber body 2a, and a spray nozzle 4 that is installed in the vicinity of the top of the inlet scrubber body 2a inside the inlet scrubber body 2a and sprays a chemical liquid Y such as water in an atomized state. The top of the inlet scrubber body 2a communicates with a processing-target exhaust gas generation source (not shown) such as a semiconductor manufacturing apparatus through an exhaust gas duct 92.

The above-described inlet scrubber body 2a is installed so as to stand on the chemical liquid tank 18, and a lower end thereof is immersed in the chemical liquid Y stored in the chemical liquid tank 18. A circulation pump 19 is installed between the spray nozzle 4 and the chemical liquid tank 18 so as to raise the chemical liquid Y stored in the chemical liquid tank 18 up to the spray nozzle 4. In addition, a lower end portion of the inlet scrubber 2 connects with an exhaust gas introduction port 15 of the cylindrical heating unit 14 through an exhaust gas supply pipe 3.

The exhaust gas processing device 1 is a device that thermally decomposes the processing-target exhaust gas E exhausted through industrial processes and having passed through the above-described inlet scrubber 2, by the electrothermal oxidative decomposition, and is generally composed of the cylindrical heating unit 14, the reactor 10 including the cylindrical heating unit 14, and the chemical liquid tank 18.

Figure 2:
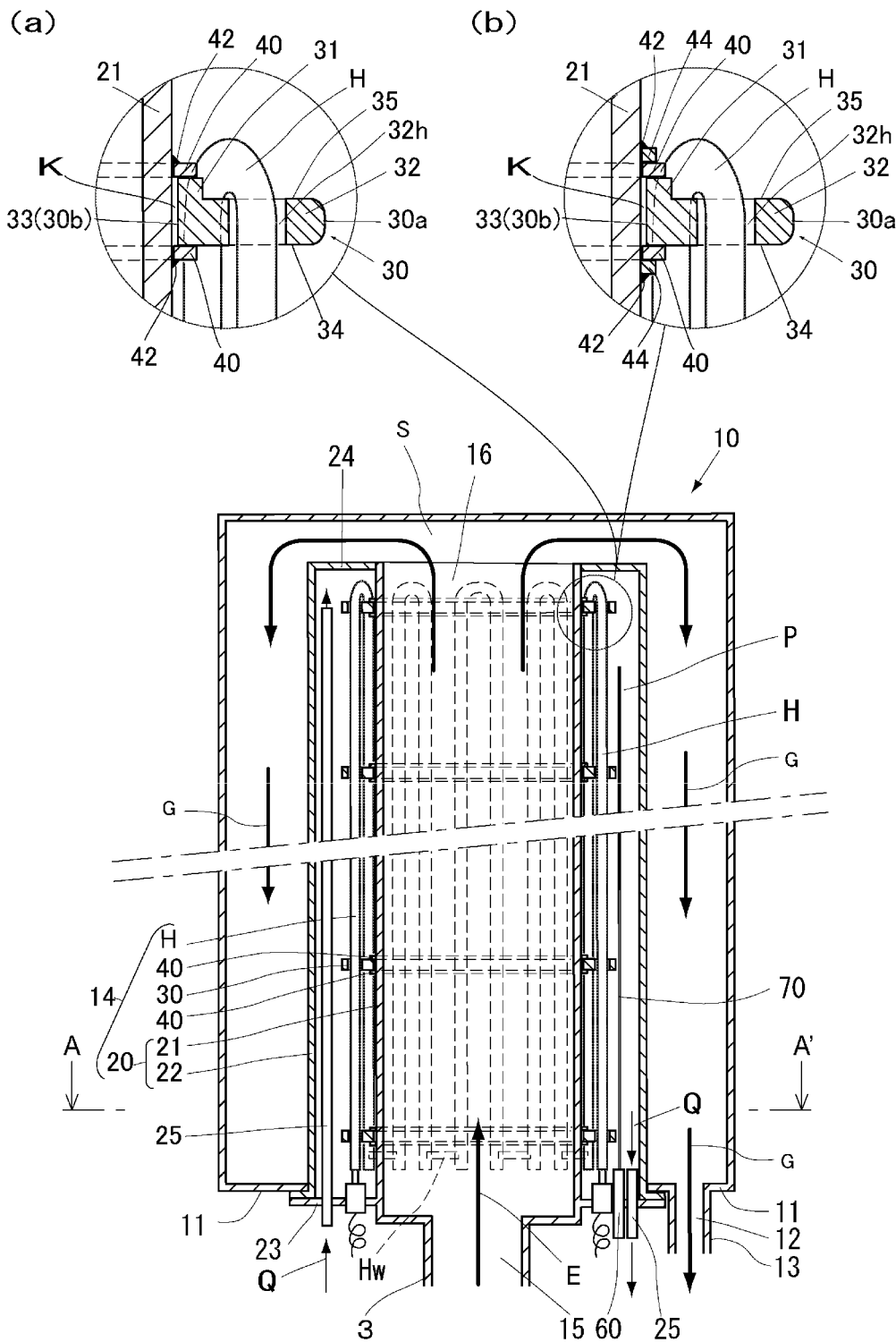
FIG. 2 is an enlarged sectional view of an exhaust gas processing device in FIG. 1.
Figure 3:
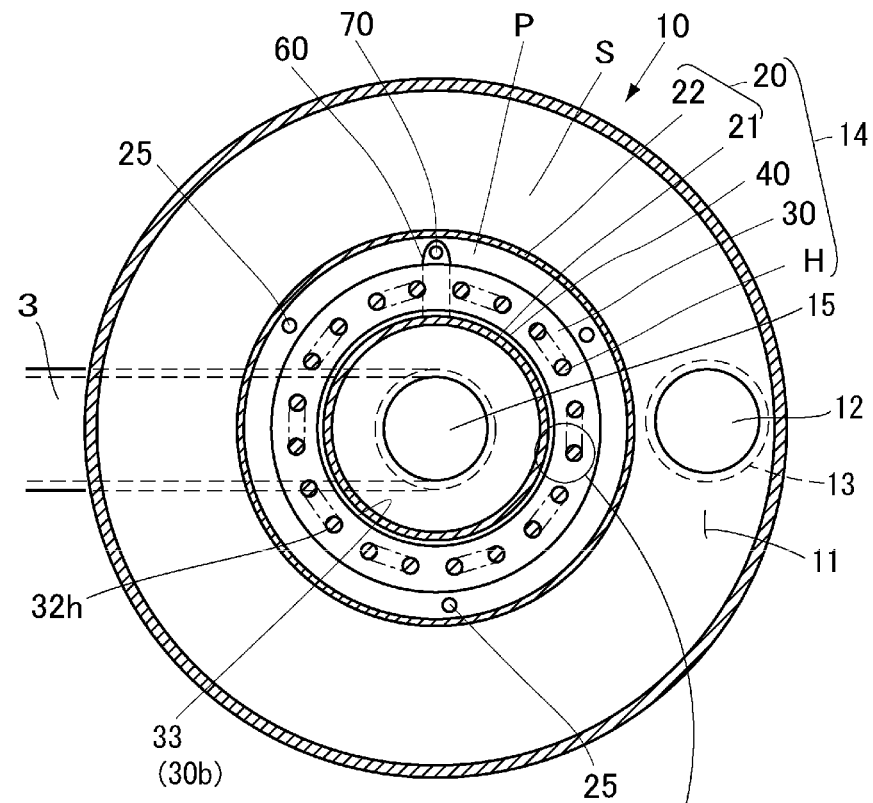
FIG. 3 is a cross-sectional view taken along a line A-A' in FIG. 2.
Figure 3:
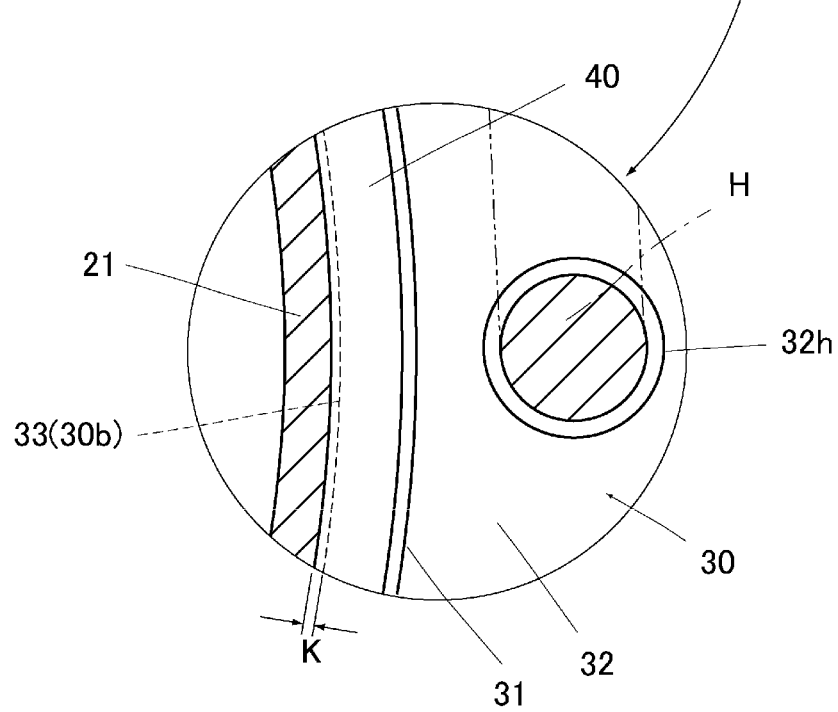

The reactor 10 or at least an inner surface thereof is made of a refractory material such as a castable refractory material, forms an exhaust gas processing space S therein, and is installed so as to stand on the chemical liquid tank 18 such that a plane portion of the reactor 10 faces the top-and-bottom direction as shown in FIG. 1. The reactor 10 is a circular cylindrical container, and is provided with an opening, in which the cylindrical heating unit 14 is mounted, in a bottom part 11 thereof. The cylindrical heating unit 14 mounted in the opening is installed so as to stand from the bottom part 11 toward a ceiling of the reactor 10. A decomposed exhaust gas exhaust port 12 is provided in the bottom part 11 of the reactor 10, adjacent to the cylindrical heating unit 14 (FIG. 2, FIG. 3). A decomposed exhaust gas exhaust pipe 13 guided from the decomposed exhaust gas exhaust port 12 is connected to an upper surface of the chemical liquid tank 18 and connects with the outlet scrubber 5 through an upper space in the chemical liquid tank 18.

A heat exchanger 50 is mounted between the exhaust gas supply pipe 3 and the decomposed exhaust gas exhaust pipe 13 so as to extend across these pipes 3 and 13, so that heat exchange is performed between a low-temperature processing-target exhaust gas E introduced in the cylindrical heating unit 14 and a high-temperature exhaust gas G thermally decomposed in the reactor 10.

The cylindrical heating unit 14 is a heat source for heating an internal space of the cylindrical heating unit 14 and the exhaust gas processing space S inside the reactor 10. Although the cylindrical heating unit 14 is formed in a circular cylindrical shape in the present embodiment, the shape of the cylindrical heating unit 14 is not limited thereto and may be formed in any shape as long as the cylindrical heating unit 14 has a cylindrical shape having both ends opened, for example, a quadrangular cylindrical shape or the like.

As mentioned above, the above-described cylindrical heating unit 14 is inserted from the opening provided in the bottom part 11 of the reactor 10 into the reactor 10, and installed so as to stand at the center of the exhaust gas processing space S of the reactor 10. An upper end opening (heated exhaust gas outlet 16) of the cylindrical heating unit 14 is disposed in an area in the vicinity of a ceiling surface of the reactor 10 and having the highest temperature.

The above-described cylindrical heating unit 14 includes: a hollow cylinder 20 having a double structure composed of an inner cylinder 21 and an outer cylinder 22 made of metal, and a ceiling plate 24 and a bottom plate 23 provided between the inner cylinder 21 and the outer cylinder 22; a plurality of insulators 30 surrounding the inner cylinder 21 and provided at intervals from each other in a heater installation space P between the inner cylinder 21 and the outer cylinder 22; electric heaters H mounted to the insulators 30; and holding members 40 attached to at least one of the inner cylinder 21 and the outer cylinder 22 and holding the insulators 30 in the heater installation space P. The holding member 40 will be described below.

In the embodiment in FIG. 2, the inner cylinder 21 of the hollow cylinder 20 having a double structure can be inserted/removed through a lower surface opening of the outer cylinder 22, in a state in which the electric heaters H mounted to the insulators 30, and a circulation pipe 25 and a temperature sensor 70 described below, are mounted to the bottom plate 23. Such a hollow cylinder 20 is referred to as insertable/removable hollow cylinder 20 (The hollow cylinder 20 may not necessarily be insertable/removable and may be an integrated type obtained by welding joint parts between the inner cylinder 21, the outer cylinder 22, the ceiling plate 24, and the bottom plate 23. Such a hollow cylinder 20 is referred to as integrated hollow cylinder 20). In a state in which the inner cylinder 21 is mounted to the outer cylinder 22, the heater installation space P is sealed and an atmosphere gas Q is supplied/exhausted through the circulation pipe 25 so as to circulate inside the heater installation space P.

The inner cylinder 21, the outer cylinder 22, the ceiling plate 24, and the bottom plate 23 of the hollow cylinder 20 are made of a highly heat-resistant and highly corrosion-resistant alloy (for example, Hastelloy, Incoloy, and Inconel (these are registered trademarks)). A steel type containing aluminum as an additive is preferable due to a reason described below.

As described above, the upper surface opening of the hollow cylinder 20 is open toward the ceiling of the reactor 10, and the upper surface opening open to the exhaust gas processing space S is the heated exhaust gas outlet 16. A lower end of the hollow cylinder 20 is connected to the exhaust gas supply pipe 3 guided from an outlet of the inlet scrubber 2, and a connection opening of the exhaust gas supply pipe 3 is the exhaust gas introduction port 15.

As mentioned above, a space between the inner cylinder 21 and the outer cylinder 22 of the hollow cylinder 20 having a double structure is the heater installation space P, and the plurality of insulators 30 are installed at constant intervals from each other in the up-down direction in this space. The insulators 30 hold the electric heaters H inside the installation space P while having electric insulation properties, and there are various shapes of insulators 30.

Figure 4:
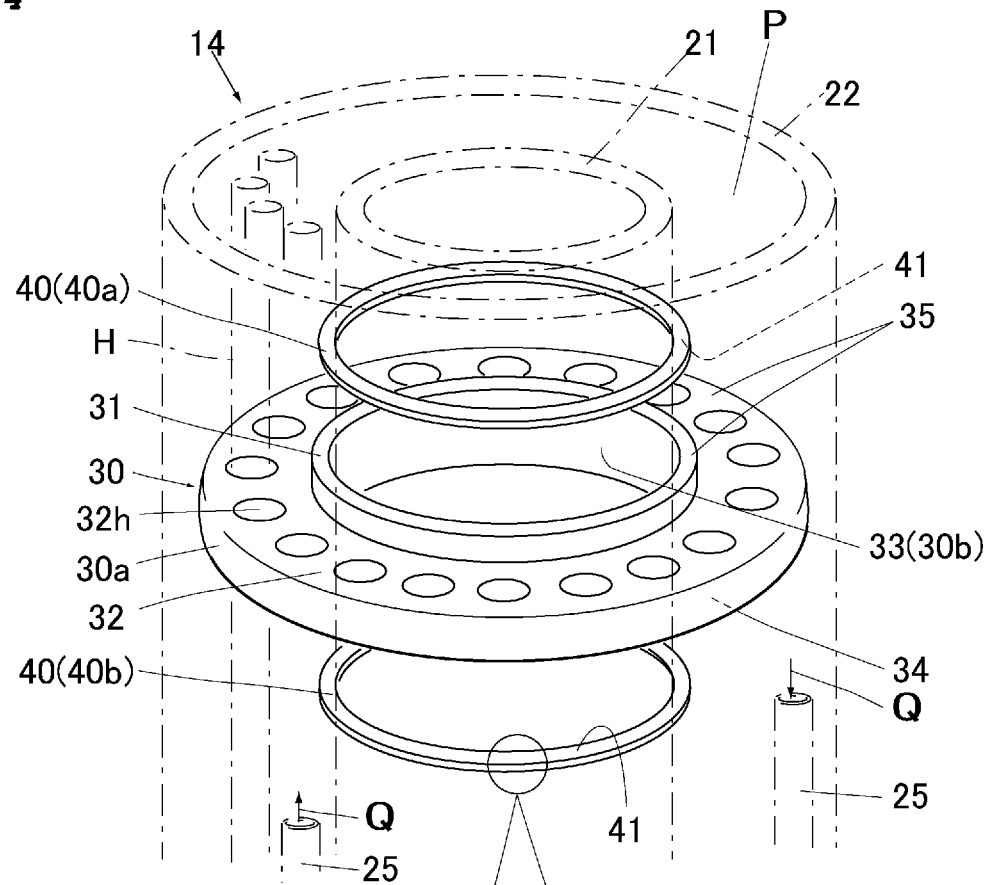
FIG. 4 is an exploded perspective view of an insulator portion in FIG. 2 and holding members holding an inner circumference portion of the insulator portion.
Figure 4:
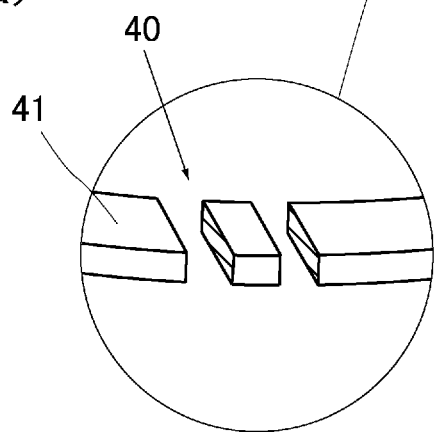
Figure 4:
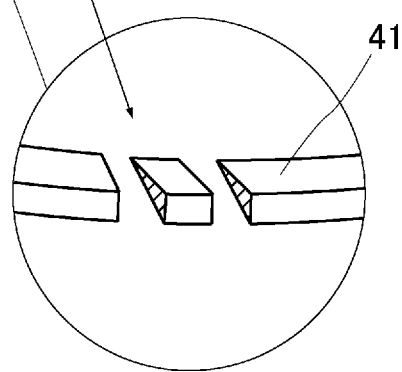

The insulator 30 shown in FIG. 4 is one example thereof, and is formed of a ceramic member having a disk shape, that is, a flat ring shape in a plan view. In the center of the insulator 30, a central hole 33 in which the inner cylinder 21 is inserted is formed, and the circumference of the central hole 33 is one step higher. The one step higher portion is referred to as circular cylindrical stage part 31, and a circular plate-like portion that is one step lower than the circumference of the central hole 33 is referred to as flange portion 32. A peripheral edge of the flange portion 32 is chamfered in an arc shape over the whole circumference and is rounded over the whole circumference. In addition, an odd number or an even number of heater holding holes 32h (12 heater holding holes in FIGS. 3 and 24 heater holding holes in FIG. 6) uniformly distributed on a concentric circumference having the same center as the central hole 33 are drilled through the flange portion 32 in the up-down direction.

Regarding the above-described heater holding holes 32h, when power supply sites for introducing power in the electric heaters H are installed on the bottom plate 23 side of the hollow cylinder 20 as shown in FIG. 2, an even number of heater holding holes 32h are provided. Although not shown, when one of the power supply sites is provided on the ceiling plate 24 side and the other is provided on the bottom plate 23 side, an odd number of heater holding holes 32h are provided.

The temperature sensor 70 may be inserted in the heater holding hole 32h and mounted so as to stand parallel to the electric heaters H.

The outer diameter of the insulator 30 is set to be smaller than the inner diameter of the outer cylinder 22, and the inner diameter of the insulator 30 is set to be larger than the inner cylinder 21, so that the insulator 30, and each of the outer cylinder 22 and the inner cylinder 21 do not come into contact with each other in a high-temperature state in which the electric heaters H are operated. A gap K is provided between an inner circumference surface 30b of the insulator 30 (that is, the central hole 33) and an outer circumference surface of the inner cylinder 21 (FIG. 3). The insulator 30 may have various shapes, and the modification thereof will be described below.

Figure 16:
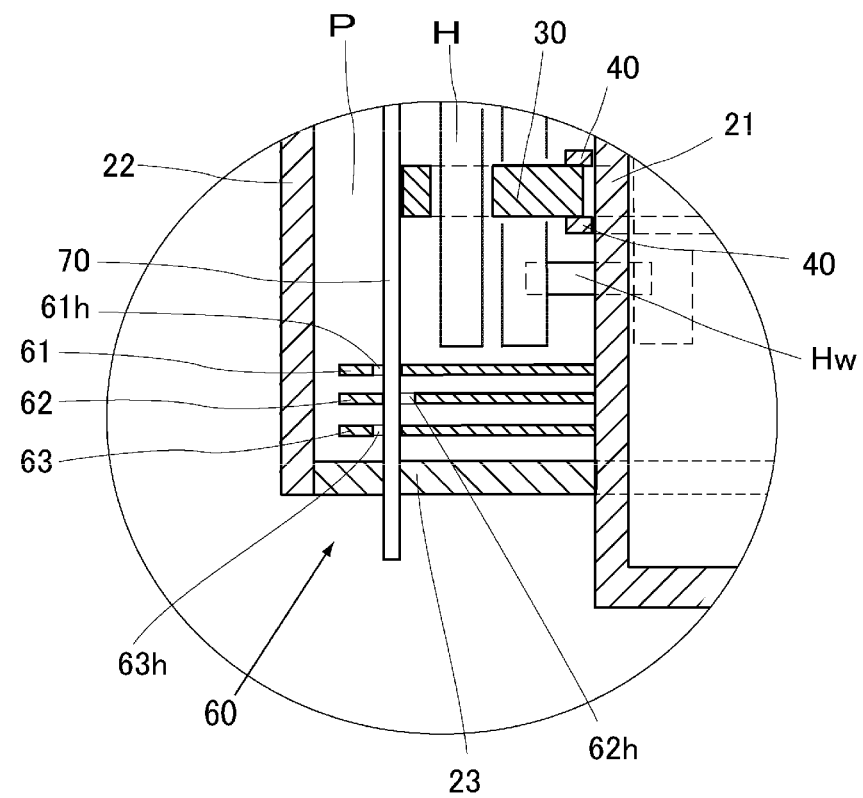
FIG. 16 is a partially enlarged sectional view illustrating first mounting state in which a temperature sensor used in the present invention is mounted.

Each electric heater H is a long heating resistor consisting of, for example, a heating element such as SiC molded into a bar shape or a U shape, in addition to a metal wire such as a nichrome wire or Kanthal wire (Kanthal is a registered trademark of Sandvik AB), and the temperature thereof is increased up to approximately 800° C. to 1400° C. by causing current to flow, according to the type and the like of the material. Here, as shown in FIG. 2, a plurality of electric heaters H each bent in a U shape are respectively installed in the heater holding holes 32h of the insulator 30 at equal intervals from each other around the axis of the inner cylinder 21, and the electric heaters H are electrically connected in series through heater connection plates Hw made of a material having excellent conductivity and corrosion resistance such as Ni (nickel) (FIG. 2, FIG. 16). A wire from a power-supply device 75 is connected to one end (a lower end in the embodiment shown in FIG. 1) in the longitudinal direction of the electric heater H.

Figure 5:
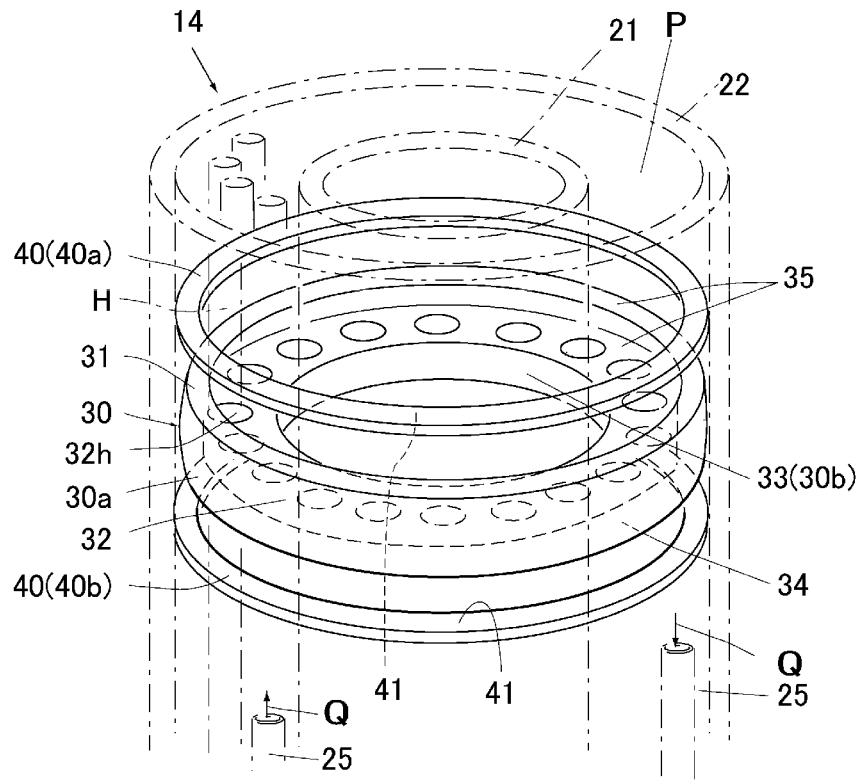
FIG. 5 is an exploded perspective view of the insulator portion in FIG. 2 and holding members holding an outer circumference portion of the insulator portion.

Although the holding members 40 may have various shapes, the holding members 40 are each formed as a ring-like metal plate in FIG. 4, FIG. 5, are attached by welding to one of the inner cylinder 21 and the outer cylinder 22 or attached to both of them (not shown), and hold the insulators 30 in the heater installation space P by supporting the insulators 30. When the holding members 40 are welded to both the inner cylinder 21 and the outer cylinder 22, such a configuration is not applied to the insertable/removable hollow cylinder 20.

The cross-sectional shape of the holding member 40 is quadrilateral as shown in FIG. 4(a) or right triangular (wedge-shaped). The holding member 40 having the right triangular (wedge-shaped) cross section will be described below, and hereinafter, the ring-like holding member 40 having the quadrilateral cross section will be described.

In FIG. 4, the holding members 40 are welded to the outer circumference surface of the inner cylinder 21 and clamp the insulator 30 from the upper and lower sides of the insulator 30, thereby fixing the insulator 30 to the inner cylinder 21. When the holding members 40 are directly welded to the inner cylinder 21 or the outer cylinder 22, the material used for the holding members 40 is the same as that of the inner cylinder 21 or outer cylinder 22. Welding portions are each referred to as a joining layer 42 (a partially enlarged view in a circle frame of FIG. 2 (a)).

Unlike the above-described case, a metal or ceramic having the material different from that of the inner cylinder 21 or the outer cylinder 22 and having a higher electric resistance value than the inner cylinder 21 or the outer cylinder 22 can be used for the holding member 40. In this case, the joining layers 42 are formed with an inorganic adhesive, instead of by welding (the partially enlarged view in the circle frame of FIG. 2(a)).

Alternatively, instead of the joining layers 42 of the inorganic adhesive, support members 44 having the same material as the inner cylinder 21 or the outer cylinder 22 may be welded to the inner cylinder 21 or the outer cylinder 22 on the upper or lower side of each holding member 40 to hold the holding member 40 (a partially enlarged view in a circle frame of FIG. 2(b)).

The outer circumference of each holding member 40 is sized so as not to exceed the outer circumference of the circular cylindrical stage part 31 (FIG. 4) to be sufficiently spaced from the electric heaters H.

In FIG. 5, the holding members 40 are mounted to the inner circumference surface of the outer cylinder 22. The material of the holding members 40 is the same as that described above, and the support members 44 are used as described above.

The insulator 30 is slightly different from that described above, and the circular cylindrical stage part 31 thereof is provided in an outer circumference portion of an upper surface 35 of the insulator 30.

A plurality of the circulation pipes 25 extending from the bottom plate 23 toward the ceiling are provided in the bottom plate 23 of the hollow cylinder 20. Various circulation pipes 25 including long ones and short ones are provided, and the long circulation pipe 25 supplies or exhausts the atmosphere gas Q in the vicinity of the ceiling of the heater installation space P, and the short circulation pipe 25 supplies or exhausts the atmosphere gas Q in the vicinity of the bottom part of the heater installation space P. Among the circulation pipes 25, the circulation pipe 25 on a supply side is connected to a supply source of an inert gas (nitrogen), or an inert gas (nitrogen) to which oxygen is periodically or non-periodically added according to the kind of the electric heater H. The atmosphere gas Q having circulated in the heater installation space P is discharged to the outside, after being taken out from the circulation pipe 25 on an exhaust side and cooled.

Each electric heater H is a bar-like member formed in a U shape in the embodiment shown in FIG. 2, or a simple bar-like member (not shown). When the electric heater H is, for example, an Fe/Cr/Al-based metal heater, alumina preventing the electric heater H from oxidizing is formed on the heater surface and thus the inert gas (nitrogen) to which oxygen is periodically or non-periodically added is selected as the atmosphere gas Q.

When the electric heater H is, for example, an SiC-based heater, any atmosphere gas Q mainly composed of nitrogen allows an SiN protective coating film to be formed on the surface of the electric heater H and thus the atmosphere gas Q not including oxygen is selected. When the atmosphere gas Q includes oxygen, Si is gradually oxidized to $SiO_2$ and the electric heater H ceases to be energized.

The hollow cylinder 20 is also exposed to high temperatures due to radiant heat from the electric heaters H all the time. When the inert gas (nitrogen) to which oxygen is periodically or non-periodically added is supplied as the atmosphere gas Q, a $Cr_2O_3$ coating film (oxidation chrome coating film) is formed on the surface of the hollow cylinder 20. When the hollow cylinder 20 is of the steel type including Al, an alumina protective coating film is formed on the surface of the hollow cylinder 20. These protective coating films restrain damage due to oxidation corrosion of the hollow cylinder 20.

The temperature sensor 70 such as a thermocouple, in addition to the circulation pipes 25 extending from the bottom plate 23 toward the ceiling, is installed in the bottom plate 23 of the hollow cylinder 20 (FIG. 16 to FIG. 20). The temperature sensor 70 is for measuring an atmosphere temperature of the heater installation space P, and the measured temperature data is provided to a power control device (not shown) that is composed of a sequencer or the like and controls output of the power-supply device 75. Accordingly, the power amount to be supplied to the cylindrical heating unit 14 is controlled based on the temperature data measured by the temperature sensor 70.

The temperature sensor 70 is held as follows. Three sensor holding plates 61, 62, 63 are used in FIG. 16, FIG. 17, and two sensor holding plates 61, 62 and the bottom plate 23 are used in FIG. 18, FIG. 19. The bottom plate 23 functions in the same way as the sensor holding plate 63 at a lower stage in FIG. 16, FIG. 17. In addition, there are two cases in which the sensor holding plates 61, 62, (63) are welded to the outer circumference surface of the inner cylinder 21 and in which the sensor holding plates 61, 62, (63) are welded to the inner circumference surface of the outer cylinder 22. Hereinafter, the case shown in FIG. 16 will be described as a representative example.

The three sensor holding plates 61, 62, 63 are welded to the outer circumference surface of the lower portion of the inner cylinder 21 so as to be arranged in the up-down direction. The three sensor holding plates 61, 62, 63 are drilled to have through-holes 61*h*, 62*h*, 63*h* on the same line extending in the up-down direction, respectively. However, the center of the through-hole 62*h* at a middle stage is slightly displaced from the centers of the through-holes 61*h*, 63*h* at upper and lower stages. Regarding the material, the sensor holding plates 61, 63 at the upper and lower stages are made of metal plates having the same coefficient of thermal expansion, and the sensor holding plate 62 at the middle stage is made of a metal plate having a coefficient of thermal expansion different from those of the sensor holding plates 61, 63 at the upper and lower stages. Accordingly, elongations of the upper and lower sensor holding plates 61, 63 differ from elongation of the middle sensor holding plate 62 during heating. Arrows in FIG. 17 represent elongations of the sensor holding plates 61, 62, 63.

Figure 17:
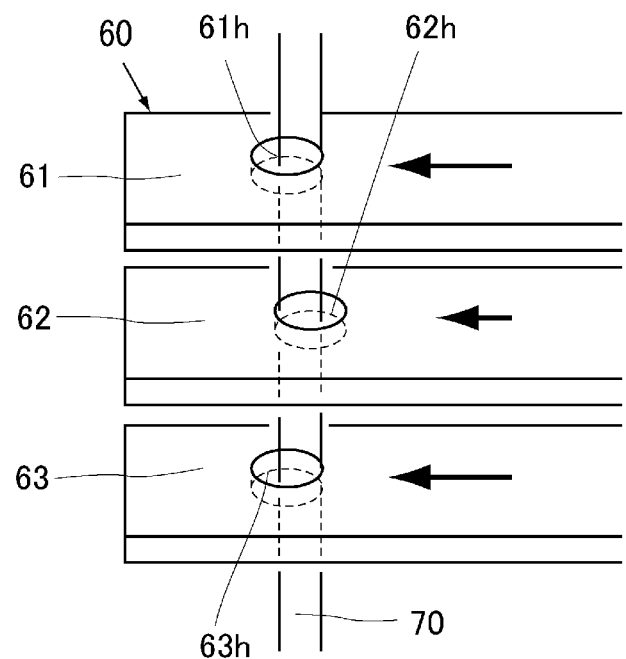
FIG. 17 is a perspective view of FIG. 16.

At normal temperatures, as shown in FIG. 17, the through-holes 61*h*, 63*h* of the sensor holding plates 61, 63 at the upper and lower stages push the side surface on the inner cylinder side (or the side surface on the outer cylinder side) of the temperature sensor 70, and the through-hole 62*h* of the middle sensor holding plate 62 pushes the side surface on the outer cylinder side (or the side surface on the inner cylinder side) of the temperature sensor 70, thereby causing the temperature sensor 70 to be installed so as to vertically stand inside the heater installation space P.

When being heated in this state, the three sensor holding plates 61, 62, 63 extend in a direction toward the outer cylinder 22, and simultaneously, the hole diameters of the through-holes 61*h*, 62*h*, 63*h* are also enlarged.

At that time, when the elongations of the sensor holding plates 61, 63 at the upper and lower stages exceed (or are below) the elongation of the sensor holding plate 62 at the middle stage, the through-holes 61*h*, 63*h* of the sensor holding plates 61, 63 at the upper and lower stages move largely (or less) toward the outer cylinder 22 side as compared to the through-hole 62*h* of the sensor holding plate 62 at the middle stage, and the through-holes 61*h*, 63*h* of the sensor holding plates 61, 63 at the upper and lower stages push the side surface on the inner cylinder side (or the side surface on the outer cylinder side) of the temperature sensor 70, while the through-hole 62*h* of the sensor holding plate 62 at the middle stage pushes the side surface on the outer cylinder side (or the side surface on the inner cylinder side) of the temperature sensor 70, thereby maintaining a state in which the temperature sensor 70 is installed so as to vertically stand inside the heater installation space P even in a high-temperature atmosphere.

Figure 18:
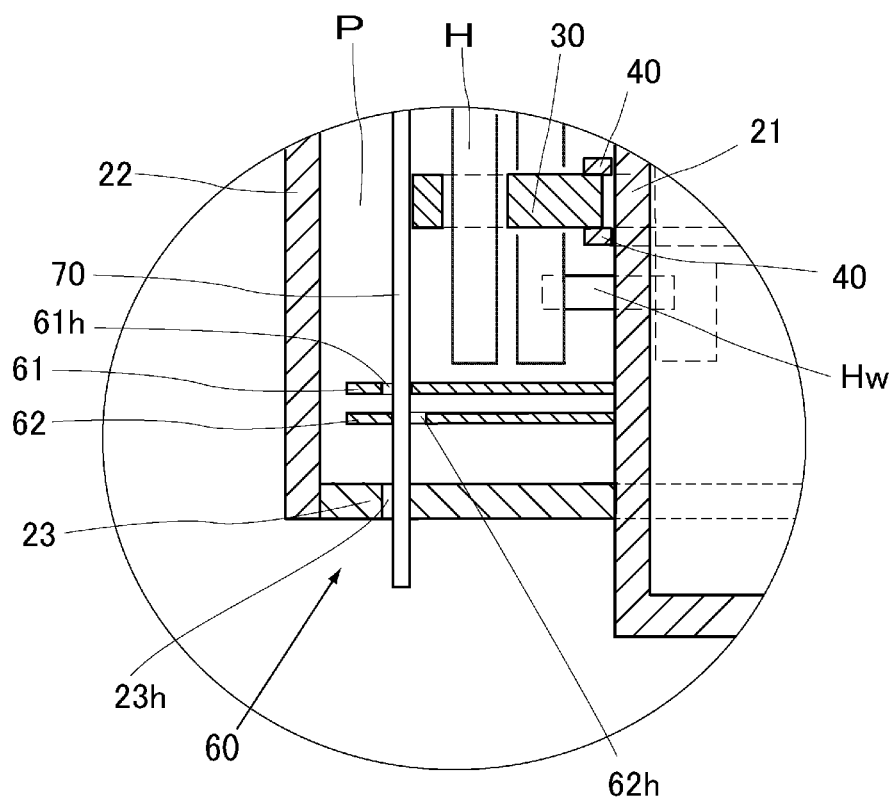
FIG. 18 is a partially enlarged sectional view illustrating a second mounting state in which the temperature sensor is mounted to an inner cylinder.
Figure 19:
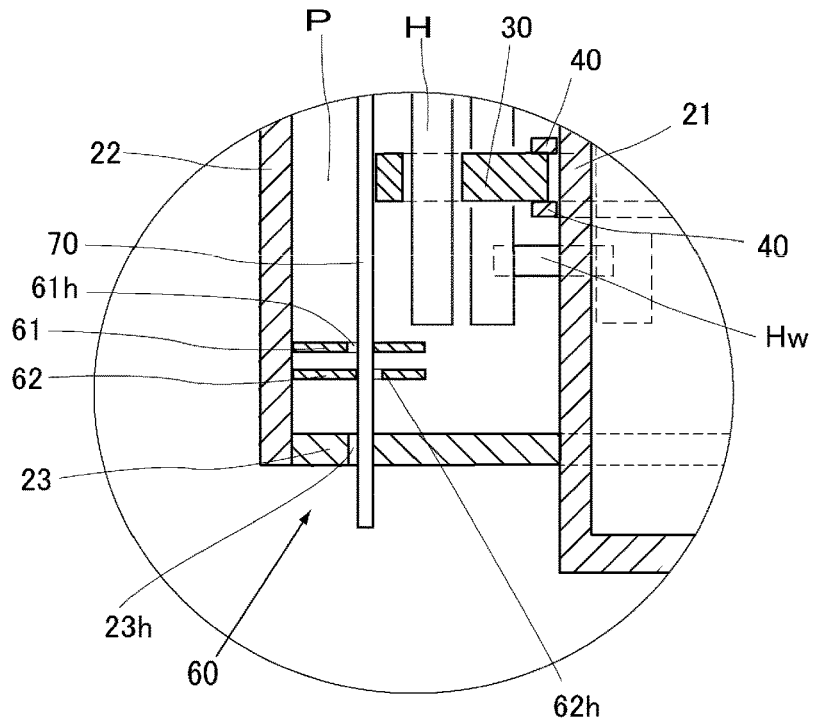
FIG. 19 is a partially enlarged sectional view illustrating the second mounting state in which the temperature sensor is mounted to an outer cylinder.

FIG. 18 shows a modification of FIG. 16, and the two sensor holding plates 61, 62 and the bottom plate 23 are used as described above. The bottom plate 23 corresponds to the above-described sensor holding plate 63 at the lower stage, and the effect is the same as that described above.

The through-hole 23h of the bottom plate 23 is provided at the same position as the through-hole 63h of the sensor holding plate 63 at the lower stage.

Figure 20:
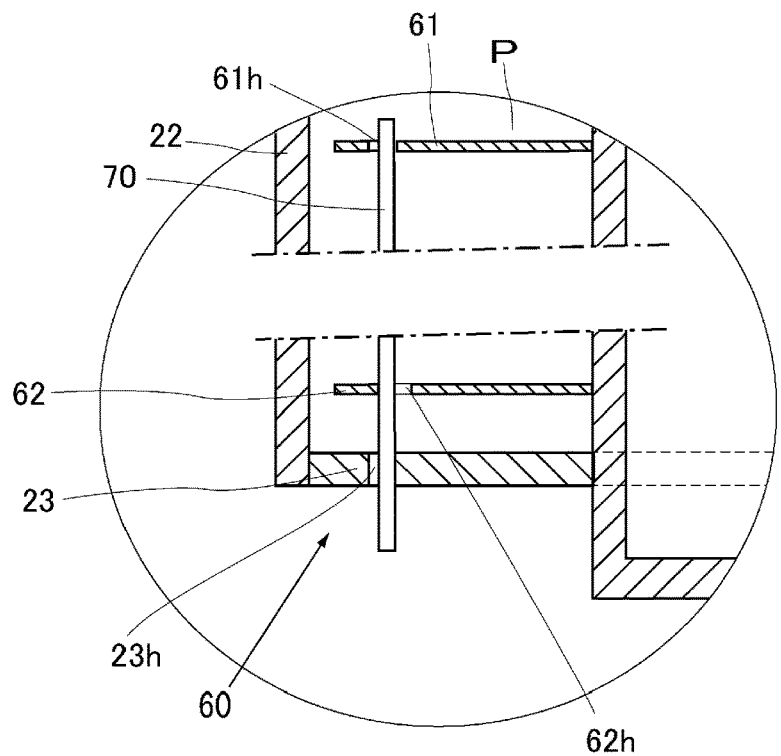
FIG. 20 is a partially enlarged sectional view in which an end portion of the temperature sensor is held by a sensor holding plate at an upper stage.

FIG. 20 shows an example in which the sensor holding plate 61 at the upper stage is provided at an end portion of the temperature sensor 70, so that the temperature sensor 70 is vertically supported over the whole length thereof.

As described above, the chemical liquid tank 18 is a tank that stores therein the chemical liquid Y to be supplied to the inlet scrubber 2 and collects the chemical liquid Y discharged from the inlet scrubber 2 and the outlet scrubber 5. Since the chemical liquid Y sprayed from the spray nozzle 7 of the outlet scrubber 5 is constantly supplied to the chemical liquid tank 18, an excessive amount of chemical liquid Y is allowed to overflow to be delivered to a wastewater treatment device (not shown) such that the chemical liquid Y to be stored does not exceed the predetermined amount. The chemical liquid tank 18 has a space between the ceiling surface thereof and the stored chemical liquid Y.

Corrosion-resistant lining or coating is applied, using vinyl chloride, polyethylene, unsaturated polyester resin, fluororesin, or the like, to parts other than the exhaust gas processing device 1 having high temperatures in the exhaust gas processing system X according to the present embodiment, to protect each part from corrosion due to corrosive components such as hydrofluoric acid contained in the exhaust gas E or produced by decomposition of the exhaust gas E.

The outlet scrubber 5 is for cooling the exhaust gas G while finally eliminating (washing with liquid) dust or water-soluble components, in the exhaust gas G, produced as a byproduct while the processing-target exhaust gas E is thermally decomposed in the exhaust gas processing device 1. The outlet scrubber 5 includes: a straight tube type scrubber body 5a; a plurality of perforated plates 6 (four perforated plates 6 in the present embodiment) installed so as to be spaced from each other in the vertical direction in the scrubber body 5a; and a downward-oriented spray nozzle 7 that is mounted right above the perforated plate 6 arranged at the top and sprays the chemical liquid Y such as water from the upper side so as to oppose the flowing direction of the exhaust gas G.

The outlet scrubber 5 is installed so as to stand on the chemical liquid tank 18 storing therein the chemical liquid Y such as water and has a lower end open to the upper surface of the chemical liquid tank 18, so that the chemical liquid Y sprayed from the spray nozzle 7 is delivered to the chemical liquid tank 18. Instead of the circulating chemical liquid Y in the chemical liquid tank 18 as described above, another chemical liquid Y is supplied, for example, water is supplied anew, to the spray nozzle 7. An exhaust fan 8 for discharging the processed exhaust gas G to the atmosphere is connected at an outlet at the top of the outlet scrubber 5.

Operation of the exhaust gas processing system X and the exhaust gas processing device 1 configured as described above will be described. First, an operation switch (not shown) of the exhaust gas processing device 1 is turned on to operate the cylindrical heating unit 14, thereby starting heating inside the reactor 10. Subsequently, when the temperature of the internal space in the reactor 10 (the temperature of the internal space in the cylindrical heating unit 14 or the temperature of the exhaust gas processing space S in the reactor 10 in the present embodiment) becomes the thermal decomposition temperature or more for the processing-target exhaust gas E due to heat of the cylindrical heating unit 14, the exhaust fan 8 is operated to start introducing the processing-target exhaust gas E into the exhaust gas processing system X. The processing-target exhaust gas E is firstly introduced into the inlet scrubber 2 and is washed in the inlet scrubber 2 with the chemical liquid Y such as water, thereby eliminating dust, water-soluble components, and the like.

The processing-target exhaust gas E washed with the chemical liquid in the inlet scrubber 2 is introduced from the exhaust gas supply pipe 3 guided from the lower portion of the inlet scrubber 2 into the internal space of the cylindrical heating unit 14 through the exhaust gas introduction port 15, so that most of the processing-target exhaust gas E is thermally decomposed by a high-temperature atmosphere in the internal space heated by the inner cylinder 21 having high temperatures by being heated by the electric heaters. Subsequently, the processing-target exhaust gas E moves to a high-temperature area, positioned at a ceiling portion of the reactor 10, in the exhaust gas processing space S through the end opening (heated exhaust gas outlet 16) of the cylindrical heating unit 14. The gas flow having moved, that is, the high-temperature gas flow containing an undecomposed processing-target exhaust gas E as a part, moves toward the decomposed exhaust gas exhaust port 12 so as to enclose the outer circumference of the cylindrical heating unit 14 while the remaining undecomposed processing-target exhaust gas E is thermally decomposed in the high-temperature area, and becomes the exhaust gas G the hazardous components of which have been completely decomposed. The exhaust gas G is introduced into the outlet scrubber 5 through the decomposed exhaust gas exhaust pipe 13 and the internal space of the chemical liquid tank 18.

After the exhaust gas G introduced in the outlet scrubber 5 is cooled while being washed with the chemical liquid Y such as water to eliminate dust, water-soluble components, and the like, the exhaust gas G is discharged to the outside of the system (to the atmosphere) through the exhaust fan 8. During operation, the atmosphere gas Q is supplied to/discharged from the heater installation space P to protect the electric heaters H and an inner wall of the hollow cylinder 20.

Here, this cylindrical heating unit 14 is the hollow cylinder 20 having a double structure with the inner cylinder 21 and the outer cylinder 22 made of metal, and the electric heaters H are not embedded in ceramic powder or a refractory material described as the background art and are partially supported by the disk-like insulators 30 only. Therefore, storage of excess heat due to ceramic powder of the refractory material is cut compared to that in the conventional example. Such a configuration can avoid causing the electric heaters H to excessively increase the temperature, and also allows the electric heaters H to quickly increase the temperature because the inner cylinder 21 and the outer cylinder 22 are made of metal. Accordingly, the disconnection due to an overload of the electric heaters H can be avoided.

Figure 8:
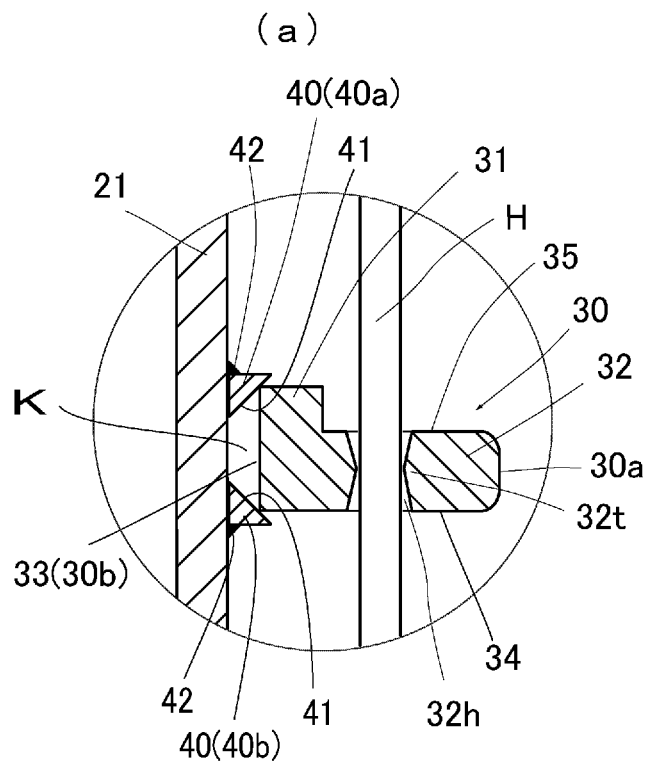
FIG. 8 shows that (a) is a cross-sectional view taken along a line B-B' in FIG. 7, and (b) shows a modification of (a).
Figure 8:
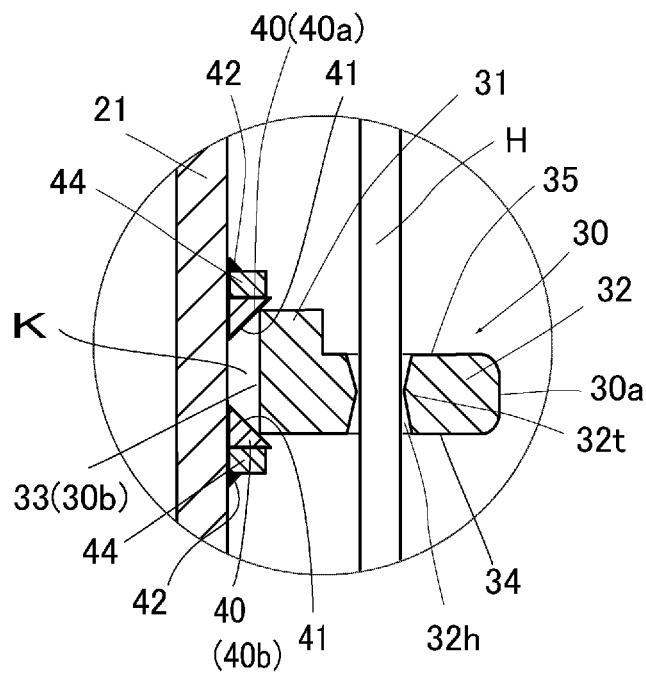

(Modification 1 of Holding Member: FIG. 4(b), FIG. 5, FIG. 8(a), (b))

The insulator 30 of the above-described embodiment is disk-like, and the upper and lower portions thereof are respectively supported by the ring-like holding members 40. Each cross section of the above-described ring-like holding members 40 is quadrilateral (FIG. 4(a)). A sufficient gap K is provided between the insulator 30 and the inner cylinder 21 made of metal. However, electric insulation properties of the insulator 30 are decreased in the high-temperature atmosphere as described above. Each ring-like holding member 40 having the quadrilateral cross section has a large contact area with the insulator 30. Accordingly, in the high-temperature atmosphere, a short circuit occurs due to an electric leakage between the electric heaters H held by the insulator 30 and the inner cylinder 21 made of metal, through each ring-like holding member 40 having the quadrilateral cross section, so that a disconnection accident of the electric heaters H is caused.

Thus, as shown in FIG. 4(b), the shape of the holding member 40 is improved to deal with such a case. That is, each holding member 40 is formed as a ring-like member having a right triangular (or wedge-shaped) cross section, inclined planes of the holding members 40 are arranged so as to oppose each other in the up-down direction as shown in FIG. 8(a), inner circumference surfaces of the holding members 40 are welded to the outer circumference surface of the inner cylinder 21, and the inner circumference ridgeline of the lower surface 34 and the upper surface 35 of the insulator 30 is held by "line contact" by the inclined planes of the holding members 40. Each inclined plane in "line contact" of the holding members 40 is referred to as contact surface 41. Accordingly, the contact between the insulator 30 and the holding members 40 is the "line contact" with the inner circumference ridgeline of the lower surface 34 and the upper surface 35 of the insulator 30, thereby greatly reducing an electric leakage through the holding member 40.

In the above-described case, since the holding members 40 are welded to the inner cylinder 21 (outer cylinder 22), the material same as that of the inner cylinder 21 (outer cylinder 22) is used for the holding members 40. However, as described above, a material different from that of the inner cylinder 21 (outer cylinder 22) and having a higher electric resistance value than the inner cylinder 21 (outer cylinder 22) can be used for the holding member 40. In addition, as shown in FIG. 8(b), the support member 44 can also be used. These points are the same as those in the above described examples.

Figure 6:
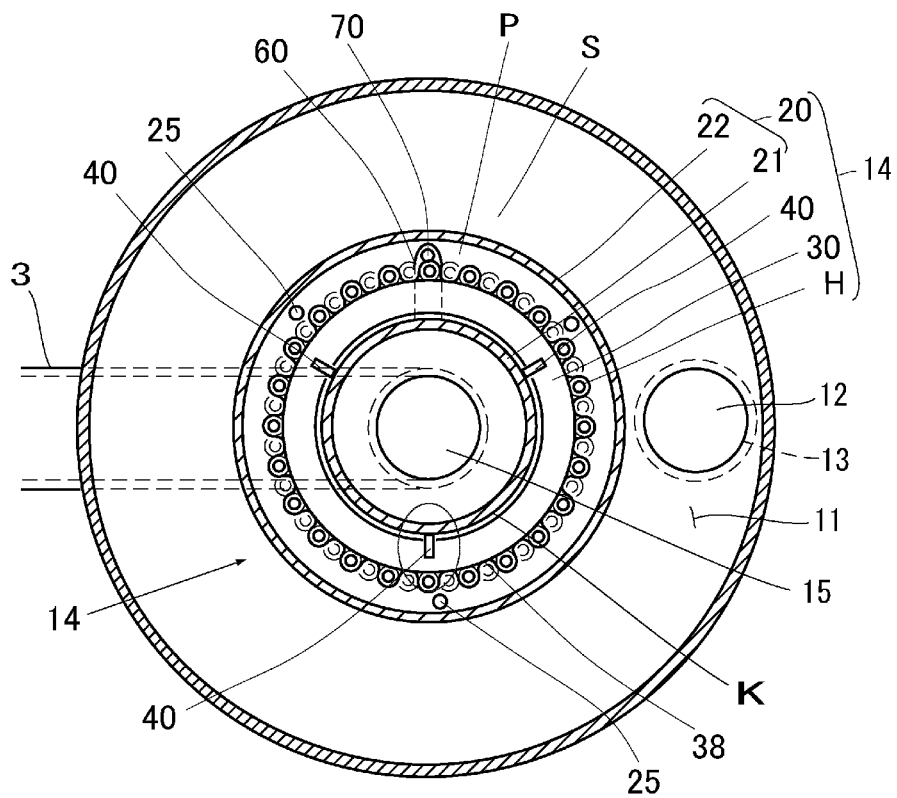
FIG. 6 is a sectional view of Modification 1 of FIG. 3.
Figure 7:
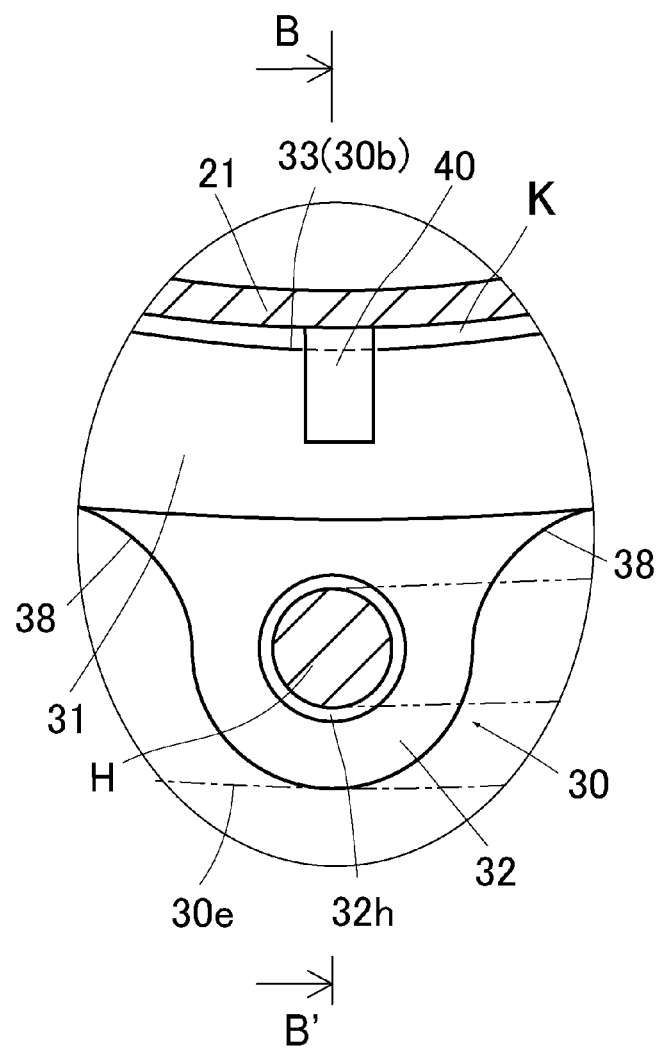
FIG. 7 is an enlarged plan view of a circle frame portion in FIG. 6.

(Modification 2 of Holding Member: FIG. 6, FIG. 7, FIG. 8(a), (b))

In this case, each holding member 40 is formed as a right triangular (or wedge-shaped) plate-like or block-like member, not a ring-like member. The right triangular plate-like or block-like holding members 40 are arranged at at least three places (of course, may be arranged at three or more places) so as to be spaced at equal angles as shown in FIG. 6 to support the insulator 30 with narrow inclined planes of the holding members 40. Accordingly, both sides of the narrow inclined plane are in "point contact" with the ridgeline of a circular-arc-shaped inner circumference surface 30b of the insulator 30 on two points. In this case, the contact area is further reduced compared with that in Modification 1, thereby restraining an electric leakage more effectively.

The above description shows the examples in which the lower surface 34 and the upper surface 35 of the insulator 30 are held by "line contact" or "point contact" with the inclined planes of the holding member 40. However, the insulator 30 only needs to be prevented from falling, and thus only the lower surface 34 of the insulator 30 may be held.

Accordingly, when the insulator 30 is held by "line contact" or "point contact", the electric leakage area can be extremely narrowed. Even if the electric insulation properties of the insulator 30 are decreased in a high-temperature atmosphere, an electric leakage amount between the insulator 30 and the inner cylinder 21 (outer cylinder 22) can be greatly restrained and the disconnection due to an electric leakage/short circuit of the electric heaters H can be avoided.

In the drawings, the holding members 40 are welded to the inner cylinder 21 as an example. However, the holding members 40 may be welded to the outer cylinder 22. Although not shown, the holding members 40 may be welded to both the inner cylinder 21 and the outer cylinder 22. The same applies to all the holding members 40. In addition, the support members 44 can also be used.

(Modification 1 of Insulator)

Figure 13:
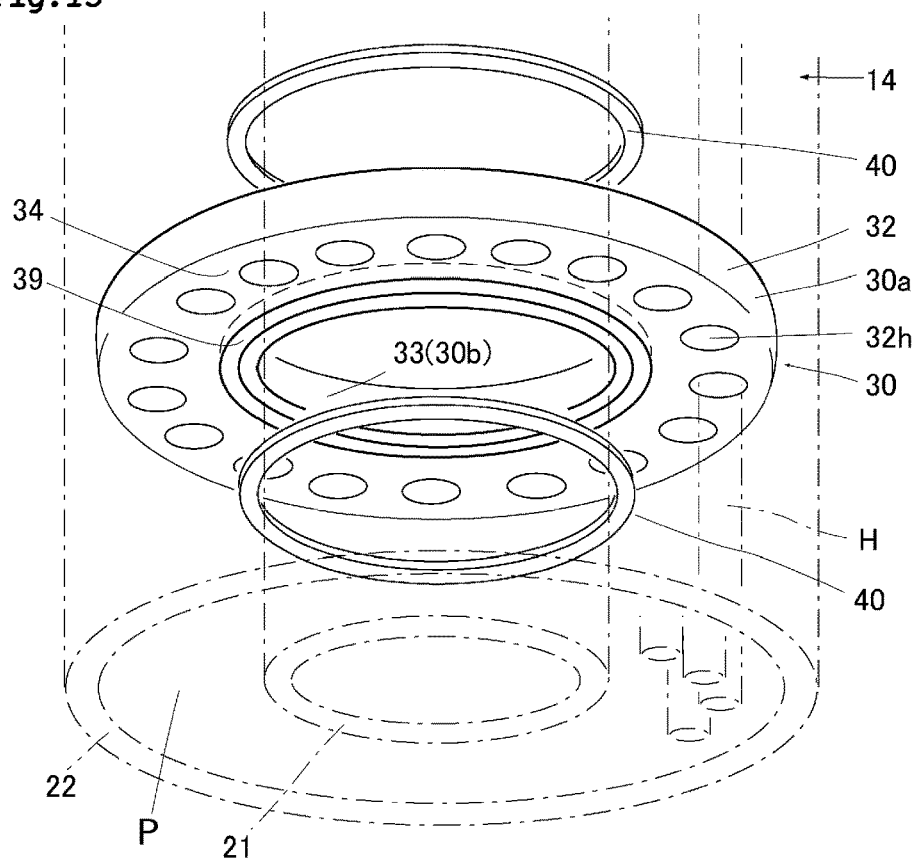
FIG. 13 is a perspective view of Modification 3 of FIG. 3 as obliquely viewed from below.
Figure 14:
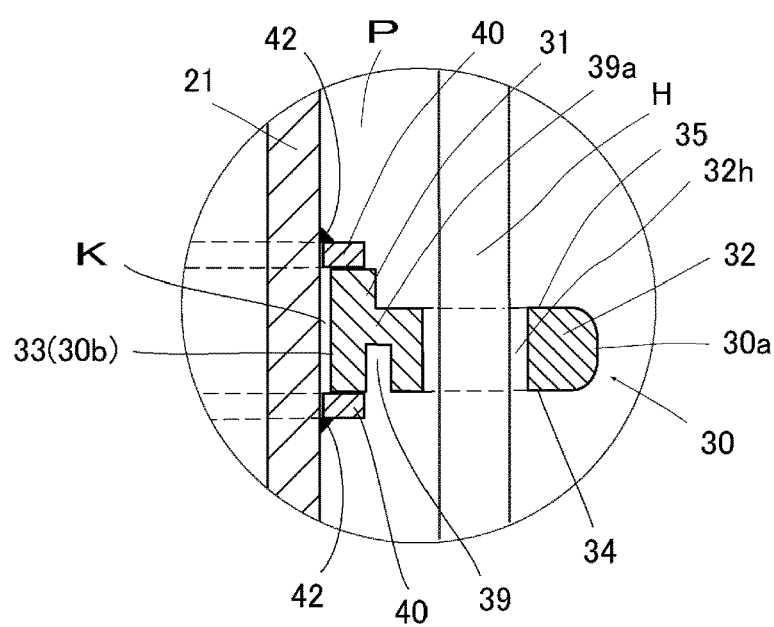
FIG. 14 is a partially enlarged sectional view of an insulator portion shown in FIG. 13.
Figure 15:
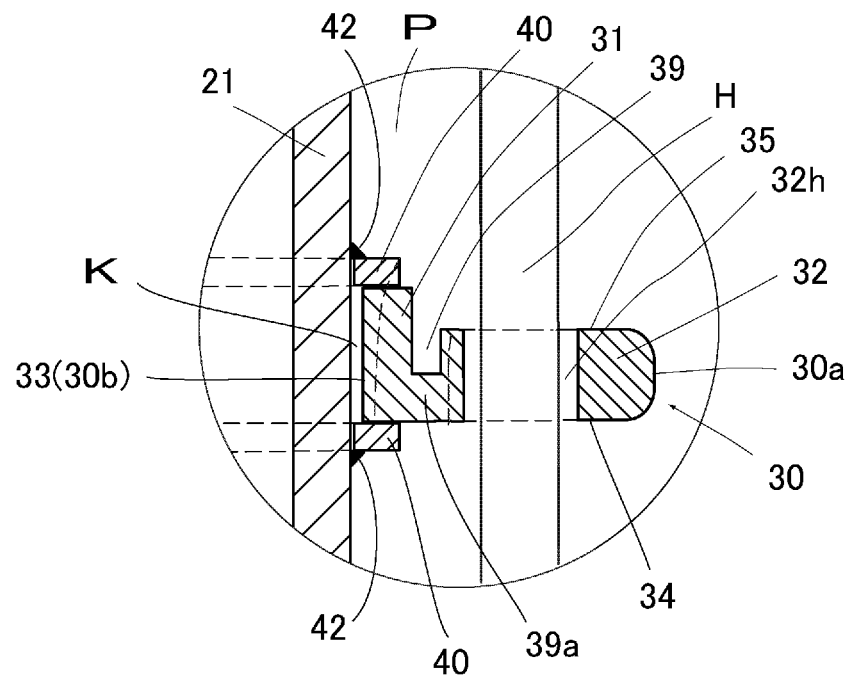
FIG. 15 is a partially enlarged sectional view of another example of the insulator portion shown in FIG. 13.

FIG. 13 to FIG. 15 each show Modification 1 of the insulator 30, and a ring-like recessed groove 39 is formed to conform with each circular cylindrical stage part 31 of the lower surface 34 or the upper surface 35 or both the upper and lower surfaces 34, 35, of the insulator 30 along the whole circumference. The example in which the ring-like recessed grooves 39 are provided in both the upper and lower surfaces 34, 35 is not shown. Accordingly, the width of a boundary part 39a between the ring-like recessed groove 39 and the circular cylindrical stage part 31 is decreased, thereby narrowing an electric leakage area of the insulator 30.

In addition, when the insulator 30 is held by the holding members 40 at both the upper and lower surfaces 34, 35 thereof, the ring-like recessed groove 39 is preferably formed such that a distance from each heater holding hole 32h to the holding member 40a on the upper surface side on the upper surface 35 of the insulator 30 is equal to a distance from each heater holding hole 32h to the holding member 40b on the lower surface side on the lower surface 34 of the insulator 30.

When the ring-like recessed groove 39 is provided, a length of the surface of the ring-like recessed groove 39 is also included in the above-described distance. In this configuration, if a surface electric leakage flowing on the surface of the insulator 30 occurs due to the high temperature, resistance values of short circuits on both sides are equivalent to each other and one of them does not cause a surface electric leakage ahead of the other. In addition, when the above-described distance is lengthened, the resistance value is increased, thereby restraining the surface electric leakage.

(Modification 2 of Insulator)

FIG. 8(a), (b) shows Modification 2 of the insulator 30, and the heater holding holes 32h each have an inner circumference surface middle portion provided with a support projection portion 32t in contact with the outer circumference surface of the electric heater H over the whole circumference thereof, as an example. The support projection portion 32t is formed to have a protruded-shape cross section in the inner circumference surface, facing the electric heater H, of the heater holding hole 32h. The apex of the support projection portion 32t is in contact with the outer circumference surface of the electric heater H, and in this case, an electric leakage area of the insulator 30 can also be narrowed as in the above description.

(Modification 3 of Insulator)

Figure 9:
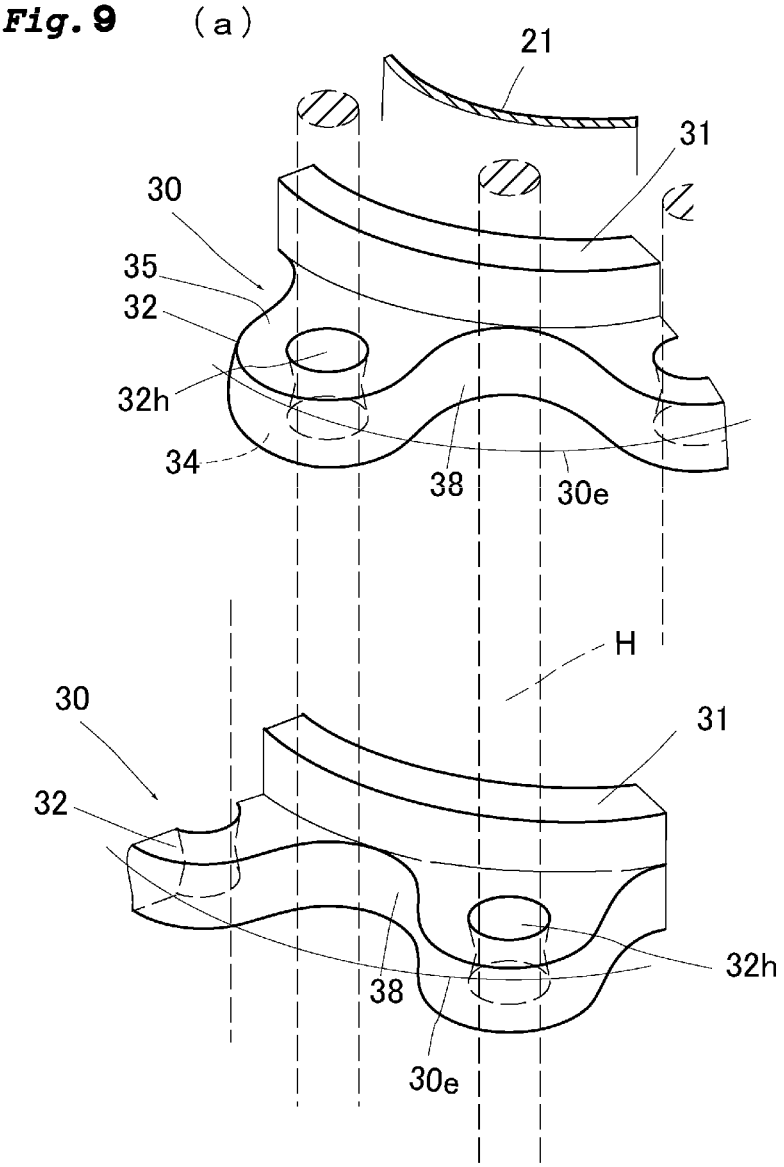
FIG. 9 shows that (a) is a partial perspective view illustrating a positional relationship between notches in FIG. 6 and insulators with respect to the notches, and (b) shows a modification of the notches in (a).
Figure 9:
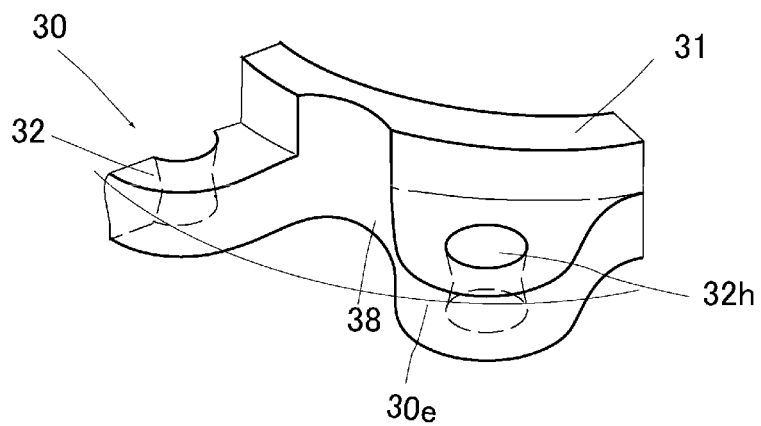

FIG. 6, FIG. 7, FIG. 9(a), (b) each show Modification 3 of the insulator 30. Even if an inert gas or the like is supplied to the electric heaters H or the hollow cylinder 20 of the cylindrical heating unit 14 to restrain oxidative consumption during heating, the surface of the cylindrical heating unit 14 is gradually oxidized due to aged deterioration. The oxidized metal oxide powder peels off from the surface and drops. When the insulator 30 is used to support the electric heaters H, most of the metal oxide powder is accumulated on the upper surface 35 of the disk-like insulator 30. If the amount of metal oxide powder is increased, the metal oxide powder causes the adjacent electric heaters H or the electric heaters H and the inner cylinder 21 (or the outer cylinder 22) to interconnect, thereby causing a short circuit and disconnecting the electric heaters H.

In this example, between the adjacent heater holding holes 32h, notches 38 are provided by cutting the insulator 30 from a circumscribed circle 30e to positions close to the inner circumference surface 30b across the heater holding holes 32h, so as to separate the adjacent heater holding holes 32h from each other. FIG. 9(a) shows an example in which the insulator 30 is cut up to positions in contact with the circular cylindrical stage part 31, and FIG. 9(b) shows another example in which the insulator 30 is cut up to positions entering the circular cylindrical stage part 31. The dropped metal oxide powder partially accumulates on the circular cylindrical stage part 31 and the rest drops further downward from each notch 38 between the adjacent heater holding holes 32h, so that a short circuit is not caused between the adjacent electric heaters H and between the electric heaters H and the inner cylinder 21 (or the outer cylinder 22).

(Modification 4 of Insulator)

Figure 10:
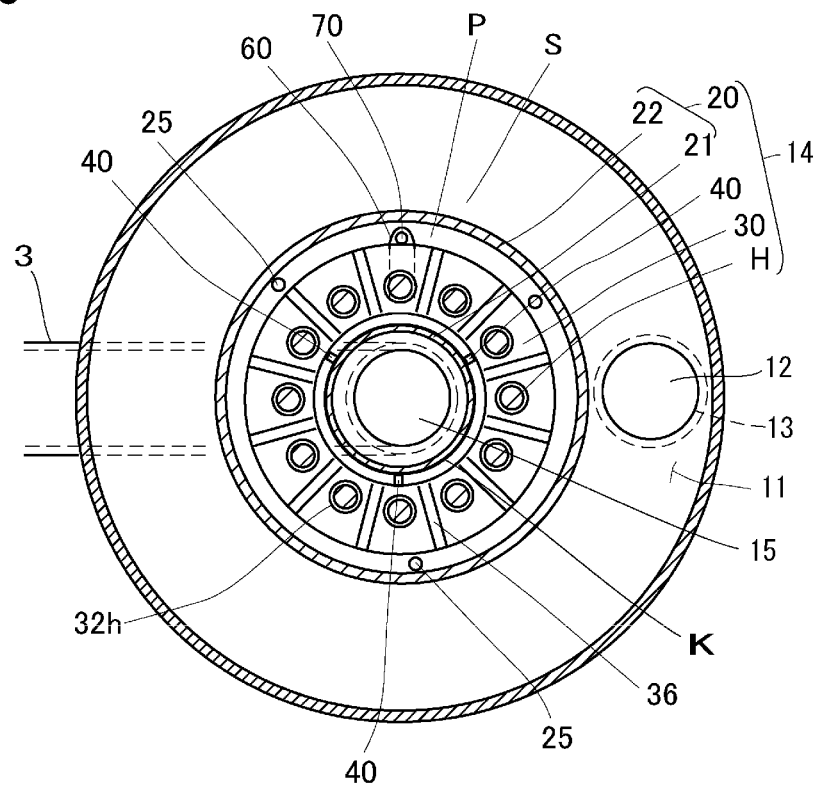
FIG. 10 is a sectional view of Modification 2 of FIG. 3.
Figure 11:
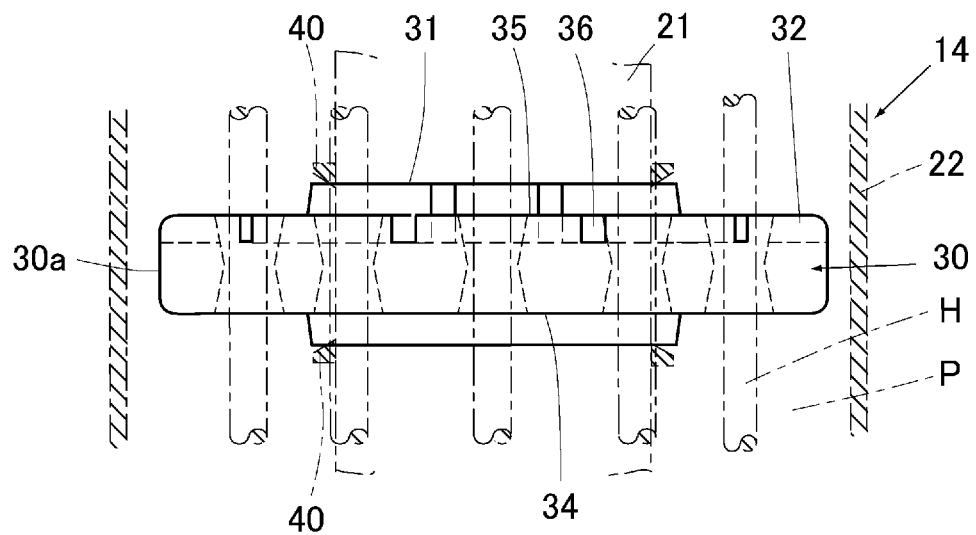
FIG. 11 is a front view of FIG. 10.
Figure 12:
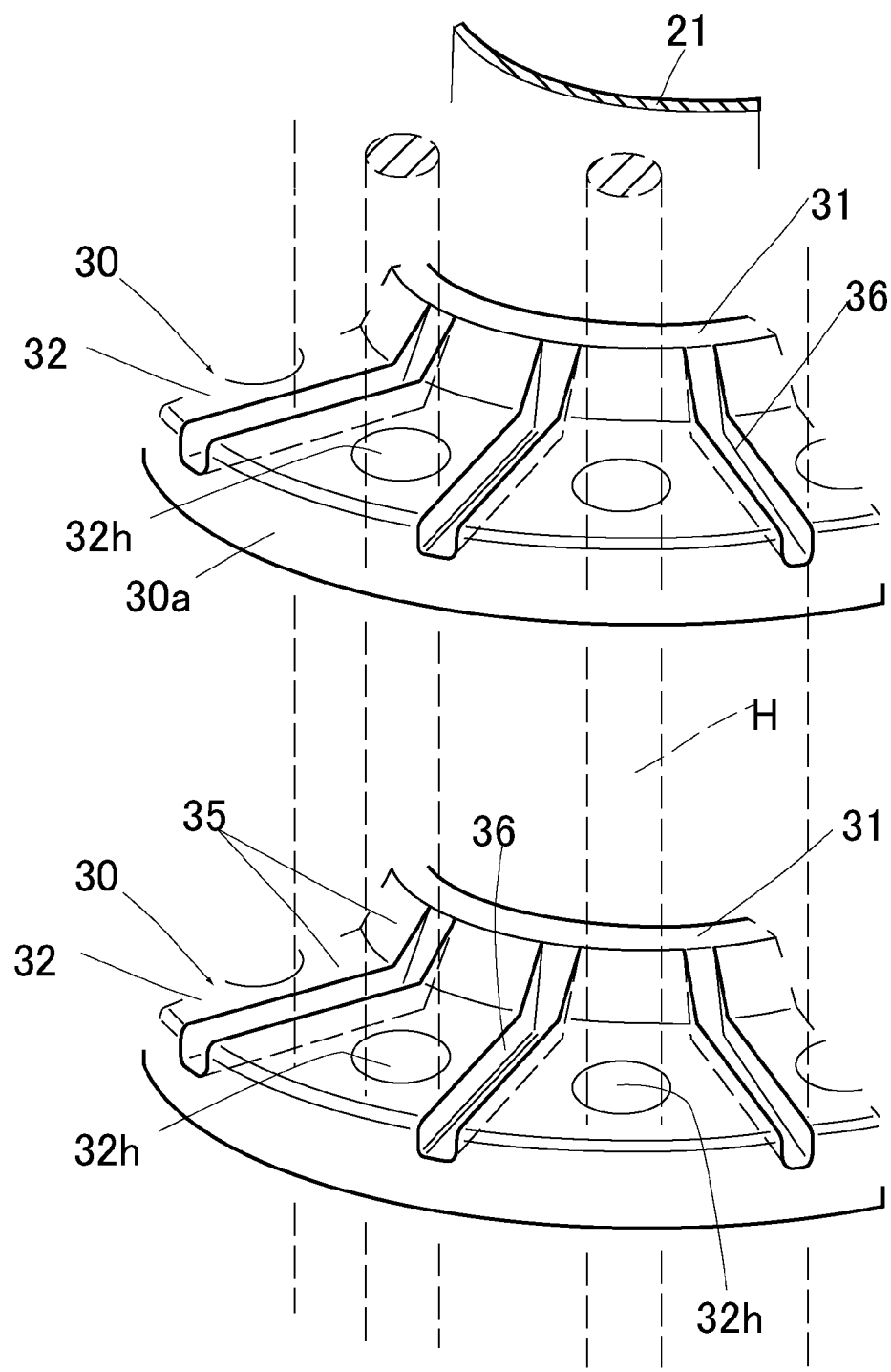
FIG. 12 is a partial perspective view illustrating a positional relationship between separate grooves in FIG. 10 and insulators with respect to the separate grooves.

FIG. 10 to FIG. 12 each show Modification 4 of the insulator 30. In each example, between the adjacent heater holding holes 32h, separate grooves 36 are provided by recessing the insulator 30 from an outer circumference surface 30a to positions close to the inner circumference surface 30b across the heater holding holes 32h, so as to separate the adjacent heater holding holes 32h from each other on the upper surface 35 of the insulator 30.

When the separate grooves 36 separating the adjacent heater holding holes 32h are provided in the upper surface 35 of the insulator 30, the metal oxide powder having dropped between the adjacent heater holding holes 32h drops inside the separate grooves 36, so that a short circuit between the adjacent electric heaters H is not caused until the separate grooves 36 are filled with the metal oxide powder.

REFERENCE SIGNS LIST 1 exhaust gas processing device
2 inlet scrubber
2a scrubber body
3 exhaust gas supply pipe
4 spray nozzle
5 outlet scrubber
5a outlet scrubber body
6 perforated plate
7 spray nozzle
8 exhaust fan
10 reactor
11 bottom part
12 decomposed exhaust gas exhaust port
13 decomposed exhaust gas exhaust pipe
14 cylindrical heating unit
15 exhaust gas introduction port
16 heated exhaust gas outlet
18 chemical liquid tank
19 circulation pump
20 hollow cylinder
21 inner cylinder
22 outer cylinder
23 bottom plate
23h through-hole
24 ceiling plate
25 circulation pipe
30 insulator
30a outer circumference surface
30b inner circumference surface
30e circumscribed circle
31 circular cylindrical stage part
32 flange portion
32h heater holding hole
32t support projection portion
33 central hole
34 lower surface
35 upper surface
36 separate groove
38 notch
39 ring-like recessed groove
39a boundary part
40 holding member
40a holding member on upper side
40b holding member on lower side
41 contact surface
42 joining layer
44 support member
50 heat exchanger
60 sensor holding part
61 sensor holding plate (at upper stage)
61h through-hole (of sensor holding plate at upper stage)
62 sensor holding plate (at middle stage)
62h through-hole (of sensor holding plate at middle stage)
63 sensor holding plate (at lower stage)
63h through-hole (of sensor holding plate at lower stage)
70 temperature sensor
75 power-supply device
92 exhaust gas duct
E processing-target exhaust gas
G exhaust gas
H electric heater
Hw heater connection plate
K gap
P heater installation space
Q atmosphere gas
S exhaust gas processing space
X exhaust gas processing system
Y chemical liquid

The invention claimed is:

1. A cylindrical heating unit of an exhaust gas processing device, the cylindrical heating unit being installed in a reactor, the reactor being provided with an exhaust gas processing space inside the reactor and a decomposed exhaust gas exhaust port for an exhaust gas processed in the exhaust gas processing space, wherein
the cylindrical heating unit is provided with an exhaust gas introduction port provided in an insertion base part thereof to the reactor, and a heated exhaust gas outlet, which is open to the exhaust gas processing space, provided at an insertion end thereof to the reactor,
the cylindrical heating unit comprises:
a hollow cylinder having a double structure with an inner cylinder made of metal and an outer cylinder made of metal;
a plurality of insulators surrounding the inner cylinder and provided at intervals from each other in a heater installation space between the inner cylinder and the outer cylinder;
electric heaters mounted to the insulators; and
holding members attached to one of the inner cylinder and the outer cylinder or both the cylinders, and holding each insulator in the heater installation space by supporting a lower surface of the insulator or supporting the lower surface and an upper surface of the insulator, and contact surfaces, with the insulators, of the holding members are each formed as an inclined plane relative to the lower surface of the insulator or each of the lower surface and the upper surface of the insulator, and the insulator is held by line contact by the holding members.

2. The cylindrical heating unit of the exhaust gas processing device according to claim 1, wherein the holding members are each a plate-like or block-like member, and are installed at at least three places with respect to the inner cylinder or the outer cylinder.

3. The cylindrical heating unit of the exhaust gas processing device according to claim 1, wherein the holding members are made of a material having a higher electric resistance value than the inner cylinder or outer cylinder, and are attached to the inner cylinder or the outer cylinder with joining layers provided by welding or with an inorganic adhesive.

4. The cylindrical heating unit of the exhaust gas processing device according to claim 1, further comprising:

support members that are made of the same material as that of the inner cylinder or the outer cylinder, are welded to the inner cylinder or the outer cylinder or both the cylinders, and support holding members on the lower side from the lower side and holding members on the upper side from the upper side.

5. The cylindrical heating unit of the exhaust gas processing device according to claim 1, wherein each of the insulators has a disk-like shape with a central hole drilled in the center thereof, and the inner cylinder is inserted in the central hole, heater holding holes for holding the electric heaters are formed at a plurality of places around the central hole, and the heater holding holes each have an inner circumference surface provided with a support projection portion in contact with the outer circumference surface of the electric heater.

6. The cylindrical heating unit of the exhaust gas processing device according to claim 1, wherein, each of the insulators has a disk-like shape with a central hole drilled in the center thereof, and the inner cylinder is inserted in the central hole, heater holding holes for holding the electric heaters are formed at a plurality of places around the central hole, and between adjacent holes of the heater holding holes, notches are provided by cutting each insulator from a circumscribed circle to positions across the heater holding holes so as to separate the adjacent holes from each other.

7. The cylindrical heating unit of the exhaust gas processing device according to claim 1, wherein, each of the insulators has a disk-like shape with a central hole drilled in the center thereof, and the inner cylinder is inserted in the central hole, heater holding holes for holding the electric heaters are formed at a plurality of places around the central hole, and between adjacent holes of the heater holding holes, separate grooves are provided by recessing each insulator from an outer circumference surface to positions across the heater holding holes so as to separate the adjacent holes from each other, in the upper surface of the insulator.

8. The cylindrical heating unit of the exhaust gas processing device according to claim 1, wherein each of the insulators has a disk-like shape with a central hole drilled in the center thereof, and the inner cylinder is inserted in the central hole, heater holding holes for holding the electric heaters are formed at a plurality of places around the central hole, and a ring-like recessed groove is provided around an inner circumference surface between the heater holding holes and the inner circumference surface of the insulator, in the lower surface or the upper surface or both the upper and lower surfaces of the insulator.

9. The cylindrical heating unit of the exhaust gas processing device according to claim 8, wherein the insulator has both the upper and lower surfaces held by the holding members, and the ring-like recessed grooves are formed such that a distance from the heater holding holes to the holding members on the upper surface side on the upper surface is equal to a distance from the heater holding holes to the holding members on the lower surface side on the lower surface.

10. The cylindrical heating unit of the exhaust gas processing device according to claim 1, wherein a sensor holding part includes three sensor holding plates that are welded to an outer circumference surface of the inner cylinder or an inner circumference surface of the outer cylinder so as to be arranged in the up-down direction and respectively have through-holes drilled on the same line and holding a temperature sensor, the through-holes are provided such that inner circumference surfaces of the through-holes of the sensor holding plates at an upper stage and a lower stage push one side surface of the temperature sensor and an inner circumference surface of the through-hole of the sensor holding plate at a middle stage pushes an opposite side surface of the temperature sensor, and the sensor holding plates at the upper stage and the lower stage are made of metal plates having the same coefficient of thermal expansion, and the sensor holding plate at the middle stage is made of a metal plate having a coefficient of thermal expansion different from that of the sensor holding plates at the upper and lower stages.

11. The cylindrical heating unit of the exhaust gas processing device according to claim 1, wherein a sensor holding part is provided in the hollow cylinder, the sensor holding part includes two sensor holding plates that are welded to an outer circumference surface of the inner cylinder or an inner circumference surface of the outer cylinder so as to be arranged in the up-down direction and respectively have through-holes drilled on the same line and holding a temperature sensor, and a bottom plate that is provided at a bottom part between the inner cylinder and the outer cylinder and has a through-hole drilled so as to be aligned with a straight line passing through the through-holes, the through-holes are provided such that the inner circumference surfaces of the through-hole at the upper stage and the through-hole of the bottom plate push one side surface of the temperature sensor, and the inner circumference surface of the through-hole of the sensor holding plate at the middle stage pushes an opposite side surface of the temperature sensor, and the sensor holding plate at the upper stage and the bottom plate are made of metal materials having the same coefficient of thermal expansion, and the sensor holding plate at the middle stage between the sensor holding plate at the upper stage and the bottom plate is made of a metal material having a coefficient of thermal expansion different from that of the sensor holding plate at the upper stage.

12. An exhaust gas processing device comprising:

a reactor provided with an exhaust gas processing space inside the reactor and a decomposed exhaust gas exhaust port for an exhaust gas processed in the exhaust gas processing space; and a cylindrical heating unit installed in the reactor, wherein the cylindrical heating unit is provided with an exhaust gas introduction port provided in an insertion base part thereof to the reactor, and a heated exhaust gas outlet, which is open to the exhaust gas processing space, provided at an insertion end thereof to the reactor, the cylindrical heating unit comprises:

a hollow cylinder having a double structure with an inner cylinder made of metal and an outer cylinder made of metal;

a plurality of insulators surrounding the inner cylinder and provided at intervals from each other in a heater installation space between the inner cylinder and the outer cylinder;

electric heaters mounted to the insulators; and holding members attached to one of the inner cylinder and the outer cylinder or both the cylinders and holding the insulators in the heater installation space by supporting the insulators, the holding members are installed at at least three places relative to the inner cylinder or the outer cylinder, and have contact surfaces relative to the insulators, and each contact surface of the holding members is formed as an inclined plane so as to be in point contact with a lower surface of the insulator or the lower surface and an upper surface of the insulator.

* * * * *